US010949404B2

(12) United States Patent
Suehs et al.

(10) Patent No.: US 10,949,404 B2
(45) Date of Patent: Mar. 16, 2021

(54) SYSTEM, METHOD AND COMPUTER PROGRAM PRODUCT FOR DATABASE CHANGE MANAGEMENT

(71) Applicant: Datical, Inc., Austin, TX (US)

(72) Inventors: Charles Steven Suehs, Dripping Springs, TX (US); Peter J. Pickerill, Austin, TX (US); Robert E. Reeves, Austin, TX (US); Daniel P. Nelson, West Lake Hills, TX (US)

(73) Assignee: Datical, Inc., Austin, TX (US)

( * ) Notice: Subject to any disclaimer, the term of this patent is extended or adjusted under 35 U.S.C. 154(b) by 44 days.

(21) Appl. No.: 16/363,859

(22) Filed: Mar. 25, 2019

(65) Prior Publication Data

US 2019/0220449 A1 Jul. 18, 2019

Related U.S. Application Data

(63) Continuation of application No. 14/201,511, filed on Mar. 7, 2014, now Pat. No. 10,268,709.

(60) Provisional application No. 61/775,244, filed on Mar. 8, 2013.

(51) Int. Cl.
*G06F 16/21* (2019.01)
(52) U.S. Cl.
CPC ................. *G06F 16/211* (2019.01)
(58) Field of Classification Search
CPC .................................... G06F 16/211
USPC ......................................... 703/22
See application file for complete search history.

(56) References Cited

U.S. PATENT DOCUMENTS

| 5,970,490 | A | 10/1999 | Morgenstern |
| 8,938,477 | B1 | 1/2015 | Tang |
| 10,268,709 | B1 | 4/2019 | Suehs |
| 2006/0122845 | A1 | 6/2006 | Denford |
| 2007/0112885 | A1 | 5/2007 | Farr |
| 2007/0112886 | A1* | 5/2007 | Huang ............... G06F 16/2379 |
| 2009/0271170 | A1 | 10/2009 | DeBarros |
| 2011/0145210 | A1* | 6/2011 | Rathinam ............ G06F 16/907 |
| | | | 707/705 |

OTHER PUBLICATIONS

Nanda_2011 (Simulation Demonstrates Performance downloaded from http://www.oracle.com/technetwork/articles/grid/o11exadata-187987.html 2011) (Year: 2011).*
Data_integrity_2012 (Data integrity downloaded from the waybackmachine archive dated Nov. 3, 2012 web.archive.org/web/20121103033242/https://docs.oracle.com/cd/B28359_01/server.111/b28318/data_int.htm) (Year: 2012).*

(Continued)

*Primary Examiner* — Brian S Cook
(74) *Attorney, Agent, or Firm* — Sprinkle IP Law Group

(57) ABSTRACT

Database servers may maintain a database according to a database schema. A database change management system can include a profile service configured to collect database profile information and a simulation service configured to receive a set of changes to be simulated for the database and simulate an application of the set of changes to the database. A forecast service can be configured to receive a result of a simulation from the simulation service and database profile information and generate a report indicative of a prediction of a failure or success of an implementation of the set of changes.

14 Claims, 21 Drawing Sheets

(56) References Cited

OTHER PUBLICATIONS

Lucas_2012 (test-driven Database Development—Why tSQLt? Aug. 21, 2012 downloaded from https://www.red-gate.com/simple-talk/sql/t-sql-programming/test-driven-database-development-why-tsqlt/?view=print[Jul. 2, 2020 5:41:52 PM]). (Year: 2012).*

Office Action for U.S. Appl. No. 14/201,511, dated Jul. 11, 2017, 29 pgs.

Nanda, Arup, Simulation Demonstrates Performance, Oracle Magazine, Jan./Feb. 2011, @ http://www.oracle.com/technetwork/articles/grid/o11exadata-187987.html), 5 pgs.

Maule, Andy et al., Impact Analysis of Database Schema Changes, ICSE'08, May 10-18, 2008, Leipzig, Germany, pp. 451-460.

Scacchi Walt, Process Models in Software Engineering, Institute for Software Research, University of California, Irvice, CA, Feb. 2001, 24 pgs.

Bauer, Ursula, Getting the Most out of LiquiBase, mgm technology partners, @ http://blog.mgm-tp.com/2011/04/data-modeling-part3/ , Jul. 4, 2011 9 pgs.

LiquiBase_quickstart, Feb. 9, 2013, downloaded from https://web.archive.org/web/20130209012310/http://www.liquibase.org/quickstart), 11 pgs.

Minick, Eric, Automating Database Deployments: Worthwhile and Supported by Tools, Blog Oct. 11, 2011, @ https://developer.ibm.com/urbancode/2011/10/11/automating-database-deployments-worthwhile-supp . . . , 4 pgs.

Office Action for U.S. Appl. No. 14/201,511, dated Feb. 2, 2018, 33 pgs.

Schwartz, Baron, How to unit-test code that interacts with a database, Aug. 19, 2008, Baron Schwartz's blog, downloaded from https://www.xaprb.com/blog/2008/08/19/how-to-test-code-that-interacts-with-a-database/), 6 pgs.

Office Action for U.S. Appl. No. dated Jun. 1, 2018, 29 pgs.

Notice of Allowance for U.S. Appl. No. 14/201,511, dated Nov. 29, 2018, 10 pgs.

* cited by examiner

FIG. 13

| DbDef | Version | Server | Database |
|---|---|---|---|
| Dev | | | |
| Austin 1 | Demo-43 | devdb1.austin.datical.com | dev1 |
| Austin 2 | Demo 43 | devdb1.austin.datical.com | dev2 |
| Bangalore 1 | Demo-32 | devdb.bangalore..datical.com | dev1 |
| Bangalore 2 | Demo-32 | devdb.bangalore..datical.com | dev2 |
| Prague 1 | Demo-32 | devdb.prague.datical.com | dev01 |
| Prague 2 | Demo-32 | devdb.prague.datical.com | dev02 |
| QA | | | |
| QA 1 | Demo-39 | devdb1.austin.datical.com | test1 |
| QA 2 | Demo-39 | devdb1.austin.datical.com | test2 |
| Production | | | |
| ec-001 | Demo-38 | 10.0.1.1 | awesomedb |
| ec-002 | Demo-38 | 10.0.1.2 | awesomedb |
| ec-003 | Demo-38 | 10.0.1.3 | awesomedb |
| ec-004 | Demo-38 | 10.0.1.4 | awesomedb |
| ec-005 | Demo-38 | 10.0.1.5 | awesomedb |
| ec-006 | Demo-38 | 10.0.1.6 | awesomedb |
| ec-007 | Demo-32 | 10.0.1.7 | awesomedb |
| ec-008 | Demo-38 | 10.0.1.8 | awesomedb |
| ec-009 | Demo-38 | 10.0.1.9 | awesomedb |
| ec-010 | Demo-38 | 10.0.1.10 | awesomedb |
| ec-011 | Demo-38 | 10.0.1.11 | awesomedb |
| ec-012 | Demo-38 | 10.0.1.12 | awesomedb |
| ec-013 | Demo-38 | 10.0.1.13 | awesomedb |
| ec-014 | Demo-38 | 10.0.1.14 | awesomedb |
| ec-015 | Demo-38 | 10.0.1.15 | awesomedb |

FIG. 14A

SYSTEM, METHOD AND COMPUTER PROGRAM PRODUCT FOR DATABASE CHANGE MANAGEMENT

CROSS-REFERENCE TO RELATED APPLICATION

This application is a continuation of U.S. patent application Ser. No. 14/201,511, filed Mar. 7, 2014, entitled "System, Method and Computer Program Product for Database Change Management," by Suehs et al., issued as U.S. Pat. No. 10,268,709, which claims a benefit of priority from U.S. Provisional Application No. 61/775,244, filed Mar. 8, 2013, entitled "SOFTWARE INTEGRATION SYSTEM AND METHOD," by Suehs et al., each of which is hereby incorporated herein by reference in their entireties for all purposes as if fully set forth herein.

TECHNICAL FIELD

This disclosure relates generally to management of computer systems. More particularly, some embodiments relate to management database systems. Even more particularly, some embodiments disclosed herein relate to a system, method, and computer program product for database change management.

BACKGROUND OF THE RELATED ART

The development of databases and database schemas is increasingly complex. Typically, database development and management involves running database instances in multiple environments. It is not uncommon, for example, to use three environments with potentially differing schema: a development environment; a quality assurance (QA) environment; and a production environment. The development environment is used in the authoring of the database structure. The QA environment allows for testing of the applications and enhancements that use the database. The production environment is the final database for general use. For example, the production environment may be a cloud computing system, an enterprise content management system or other system that makes use of the database.

Changes in a schema in a development environment may be migrated to the QA and production environments. At various times, the different environments may have different schema. Moreover, multiple instances of a database in the same environment may be using different versions of a schema depending on when the database was last updated. This can result in errors when changes are migrated from one database to another.

Conventionally, schema management is handled through the generation, review, and execution of SQL scripts executed against the target database instance. Building a new database or modifying an existing database may be dependent on hundreds of small scripts to build out new environments or evaluate existing ones. Once executed, the scripts generally leave no history of their passing other than the presence of the pieces they create, delete or modify. Thus, it can be difficult to reproduce how schema changes were applied. Moreover, there is no traceable history of who did what and why from environment to environment. Application issues caused by database errors become hard to troubleshoot because there is no easily digestible standard to use as measuring stick in evaluating a malfunctioning environment.

In view of unique challenges in authoring, discovering, and migrating database structure changes, there is room for innovations and improvements.

SUMMARY OF THE DISCLOSURE

Embodiments disclosed herein provide a system, method, and computer program product for database change management. A database change management system, in accordance with some embodiments, can include a processor and a non-transitory computer readable medium storing computer executable instructions executable to provide a set of services including: a profile service configured to collect database profile information; a simulation service configured to receive a set of changes to be simulated for the database and simulate an application of the set of changes to the database; and a forecast service configured to receive a result of a simulation from the simulation service and database profile information and generate a report indicative of a prediction of a failure or success of an implementation of the set of changes.

According to some embodiments, simulating application of the set of changes to the database includes accessing a model of the database schema and applying the set of changes to the model of the database schema. The model of the database schema can include an object model comprising table objects, column objects, and constraint objects related according to a database schema of the database. The simulation service can be provided with or be configured to build the model of the database schema. In some embodiments, the simulation service is configured to receive a snapshot set of changes and build the database model by loading an empty database model in memory and changing the database model according to the snapshot set of changes.

In some embodiments, applying the set of changes to the model of the database schema includes (a) selecting a change from the set of changes as a selected change; (b) determining if application of the selected change to the model of the database schema would result in an error; if so, recording the error; otherwise, manipulating the model of the database schema according to the selected change to update the model of the database schema. Steps a-b can be repeated for each change in the set of changes until all the changes in the set of changes have been used as the selected change.

A database change management system may also include a schema migration service configured to implement a migration of the database schema to a second database. In some embodiments, the system includes a graphical user interface for viewing multiple databases in a radar view, wherein the multiple databases are plotted in sectors and at radii based on a state, revision, or step classification. Such a display may aid in identifying the databases to which schema changes should be migrated.

Another embodiment can include a method for database change management comprising: receiving a set of proposed changes to a database schema; accessing a model of the database schema in memory, the model of the database schema comprising representations of tables, columns and constraints; simulating an application the set of proposed changes to the database and reporting a result of simulating the application of the set of proposed changes.

Another embodiment can comprise a computer program product comprising a non-transitory computer readable medium, storing a set of computer executable instructions executable to perform a method comprising: receiving a set of proposed changes to the database schema; accessing a model of the database schema in memory, the model of the database schema comprising representations of tables, columns and constraints; simulating an application the set of proposed changes to the database and reporting a result of simulating the application of the set of proposed changes. The computer executable instructions may further comprise instructions executable to establish a connection with a database and collect a snapshot of the database.

Simulating the application of the set of proposed changes to the database can include selecting a change from the set of proposed changes as a selected change, evaluating application of the selected change against the model of the database schema to determine if the selected change would result in an error and if so, logging the error; otherwise, manipulating the model of the database schema according to the selected change to update the model of the database schema. In some cases, the model of the database schema may be manipulated according to a change even if the change would result in an error.

The snapshot may include a change log. According to one embodiment, the model of the database schema may be built from the change log. An empty model may be loaded in memory and the snapshot changes applied to the model to populate the model of the database schema. This can provide a baseline schema model against which proposed changes can be evaluated. In some cases, the proposed changes can be added to the same change log as the snapshot changes.

In some embodiments, determining if the application of the selected change would result in an error comprises evaluating the selected change against a set of constraints modeled in the model of the database schema.

Embodiments described herein provide an advantage by determining whether a schema change will be successful before the schema change is applied. Accordingly, errors that may result when migrating a schema change from a first database (for example, a development database) can be identified prior to the schema change being made to another database (for example, a production database).

Embodiments provide another advantage by providing a model that maps out objects in a database schema and relationships between objects. The model can include information to document the purpose and history of each object.

According to some embodiments, schema change can be managed by incrementally updating a limited number (in some cases a single) historical document.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 13 is a diagram schematically illustrating a results screen according to embodiments.

FIGS. 14A, 14B and FIG. 14C depict large scale status screens according to embodiments.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Embodiments described herein can provide a database change management system that facilitates authoring, discovering, or migrating database structure (schema) changes from one database instance to another. However, before discussing database change management, an architecture for one embodiment of a management system is provided. The management system may be configured as a database change management system or for managing other systems.

Figure 1:
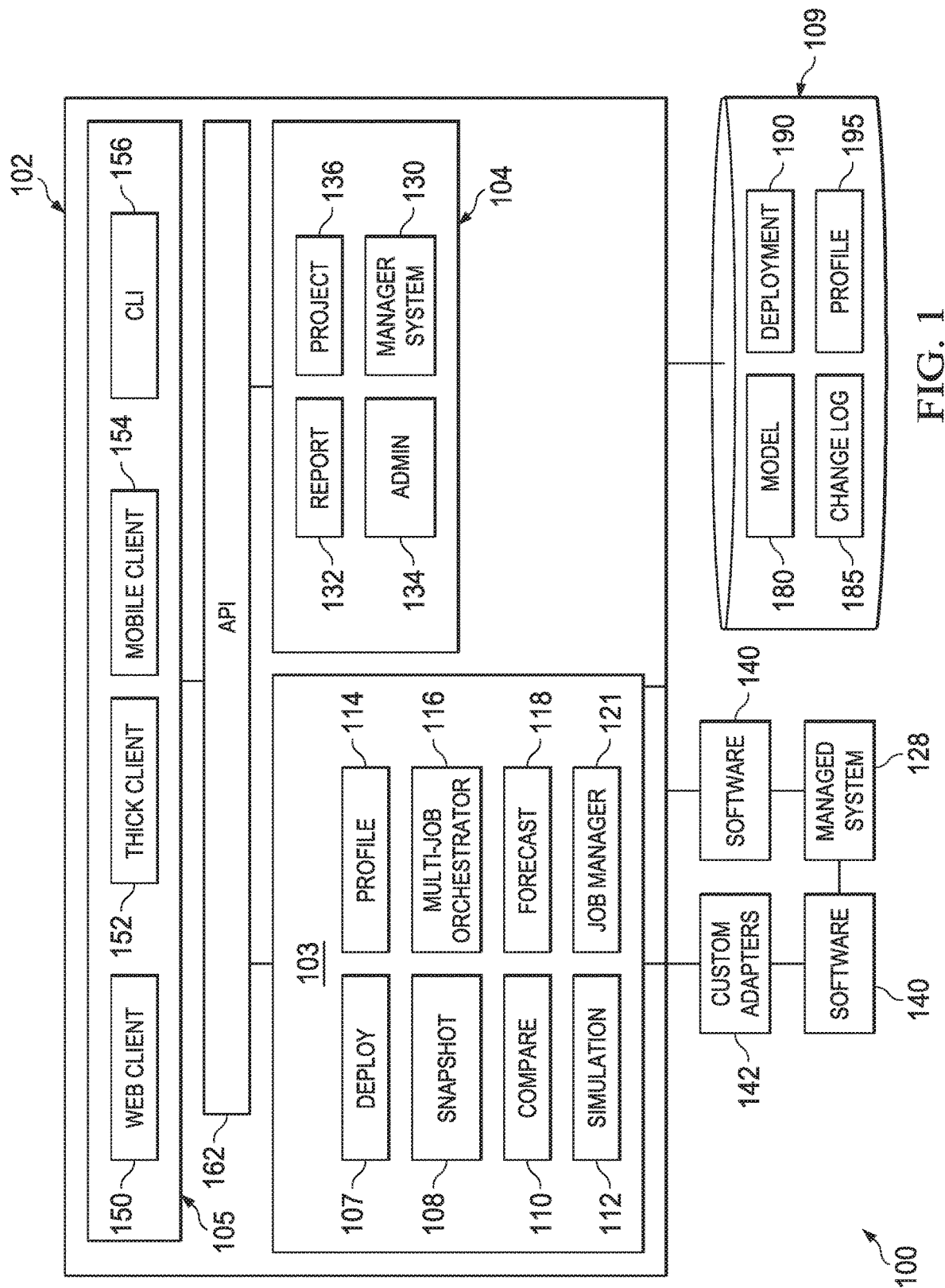
FIG. 1 is a diagrammatic representation of one embodiment of a management system.

FIG. 1 is a diagrammatic representation of one embodiment of a management system 100 having a framework 102 that provides a variety of job services 103 and system services 104. User interface modules 105 can provide access to framework 102 by human and programmatic users. Framework 102 may include or be in communication with a framework database 109 for storing outputs of the various services, such as results or simulations, reports, snapshots, and the like. The various service modules, databases and software components illustrated in FIG. 1 may be provided by a single computer or may be distributed across multiple computers.

Job services 103 perform various system management tasks provided by framework 102. According to one embodiment, job services 103 include a job request manager 121 that can route requests to one or more of a deploy service 107, snapshot service 108, compare service 110, simulation service 112, profile service 114, forecast service 118, and multiple job orchestration service 116. System services 104 can be used by administrators of framework 102 to control usage of the framework in an organization. Example system services include managed system service 130, report service 132, admin service 134 and others.

Various job services 103 can interact with managed systems 128 to collect information from and update the configuration of the managed systems. However, there may be existing (or developed) software components and engines that already perform certain tasks. For example, there are a number of off-the shelf and open source software components that can collect information from a variety of managed systems 128 and receive inputs to affect configuration changes to a managed system. To this end, various software components 140 can be integrated with components of framework 102. For example, various services may integrate third-party systems management engines to perform various tasks, such as taking snapshots, making profiles, and communicating changes. In some cases, the integrated software components 140 comprise management code installed on or that interacts with a managed system 128 to collect data of interest or update configuration.

According to one embodiment, integrated software components 140 may include open-source software modules used to manage schema changes. In some embodiments, the Liquibase engine may be used (Liquibase is Open Source software available from www.liquibase.org) to snapshot a database schema. Other embodiments may integrate with other database change engines, refactoring systems and database versioning tools that can provide a description of a database schema or other functionality. Furthermore, framework 102 may integrate software components 140 providing any other desired management functionality.

A software component 140 may provide a native Application Programming Interface (API) that handles the exchange of information between the integrated software and the framework 102. In other embodiments, one or more custom adapters 142 can be used to allow a software component without a native API for framework 102 to communicate with other components of framework 102. Regardless of the method used to integrate with the framework 102, the adapter, native API or other integration can include a data model specification. Framework 102 can use a data model to communicate commands and data to/from a managed system/integrated software. For example, a data model can provide a consistent and predictable model to communicate system status (e.g., for the snapshot service 108 or profile service 114 or other services) and describe changes the user wishes to make to the managed system (e.g., for deploy service 107, simulation service 112 or other services). New adapters and APIs can be developed for additional integrated software, mapping the data model used by framework 102 to the specific commands and interfaces used by the integrated software. Thus, framework 102 can be extensible to handle a variety management functions by integrating new software components 140 with job services 103.

Framework 102 may employ user interface modules 105 such as, for example, a web interface 150, a thick client interface 152, a mobile client interface 154, a command line interface (CLI) 156. Web interface 150 requires only a web browser that preferably provides a runtime environment to support web client applications. In this case, framework 102 can be hosted on a system accessible to a user via the internet or a local intranet. In some embodiments, users of this interface will be able to perform all actions provided by the framework. Web interface 150 may provide an application operating in the browser runtime environment.

A thick client is a client application that a user installs on the user's local system in order to gain access to framework 102. Once installed, the user can perform tasks provided by the framework 102. In some embodiments, a thick client may provide more in depth tools for evaluating data provided by and authoring content used by framework 102 in managing IT systems, while the web interface 150 provides a more limited set of tools. In other embodiments, the web interface 150 and thick client can provide the same tools.

Mobile interface 154 can provide a method for accessing framework 102 on smart phones and computing tablets and the like. According to one embodiment, mobile interface 154 can offer all of the functionality of web interface 150, but in other embodiments can be designed to emphasize the reporting, job approval, alerts, and job history views.

CLI 156 can provide methods to access framework 102 without relying on a graphical tool such as a web browser or thick client application. To use CLI 156, a user types commands and arguments to those commands into a text terminal (for example, but not limited to cmd.exe on Windows or bash/sh/ksh etc. on Linux) or the like. The text terminal runs on a system that has network access to framework 102 (such as a network connected terminal). CLI 156 can enable shell or batch scripting of framework 102 tasks and provide an integration point for other information technology assets (test automation systems, build systems, application deployment automation programs).

A thick client application, web client application mobile application, or other interface can be provided to extend the capabilities of underlying integrated software components 140. Since many applications for managing IT systems have esoteric ways of providing and storing data, a thick client, web client application, mobile application can provide a series of graphical interfaces ('Wizards') the can ease the task of authoring data or requests for the management applications.

An access control API 162 can act as a gatekeeper to accessing data and performing tasks with framework 102. According to one embodiment, requests from all interface modules 105 pass through access control API 162. When a request is made by a user, API 162 consults the database 109 or a local cache of permission information for users that have recently made a request. If it is determined the user has permission to make the request, the request is forwarded to the appropriate service for completion. If the user does not have permission to submit the request, the user is notified that access is denied. These permissions can include, but are not limited to the following: individual and group access (read-only; read and write; none) to specific managed systems; individual and group access (read-only; read and write; none) to job services 103 (snapshot, deploy, forecast, etc.); individual and group access (read-only; read and write; none) to system services 104 (managed system service, report service, admin service); individual and group access (read-only; read and write; none) to specific software integrations. As an example, a user or group of users can be permitted to use an enabled software component 140 to manage database schema changes but forbidden to use an integrated software component 140 that manages network switches.

Turning now job services 103, snapshot service 108 connects to managed system 128 and collects information about the current state of managed system 128. Snapshot service 108 may utilize an integrated software component 140 to determine the current state of managed system 128 as it pertains to the integrated software and store the snapshot in the format utilized by other components of framework 102. As an example, snapshot service 108 may integrate a software component 140 to collect a snapshot of the schema as it is currently; a firewall configuration tool to collect a snapshot of the current rules being applied on the firewall to control access, a storage array management tool to collect a snapshot of rules for routing data to storage, etc.

Snapshot service 108, thus, provides a current configuration of a managed system. The information may be returned in a persistable format to the job request manager 121. Job request manager 121 can store the information in database 109, return the information to a requesting user or provide the information to another service.

Deploy service 107 affects changes on a managed system. The user provides the identifier(s) for the managed system(s) targeted and the data necessary to perform the desired change in a text, xml or similar document. Deploy service 107 then attempts to execute the change and returns whether the job succeeded or failed and any descriptive information about the job (logs, reports, return codes, etc.) to job request manager 121. Job request manager 121 can store the information in database 109. In the event of a failure, a rollback function can optionally be called to revert all changes made by the job up to the point of failure. In some cases, deploy service 107 may integrate with a software component 140 and provide requests to the software component 140 so that software component 140 propagates the change.

Simulation service 112 predicts the impact of proposed changes against targeted managed system(s) and returns a model of what the managed system(s) may look like after execution. Simulation service 112 also predicts any errors or failures a deploy job might encounter based on the proposed changes. According to one embodiment, simulation service 112 can map proposed changes to managed system 128 to commands run against a model of the managed system to determine the impact of the changes. Job information, such as logs, return codes, model of predicted system state, and errors can be returned to job request manager 121 for entry in database 109.

Profile service 114 can retrieve information about the current state of managed system 128 and augment data returned by snapshot service 108 with other data that might impact the application of changes. For example, when performing updates to a database schema it may be helpful to know how many records a table contains to gauge how long a change might take and how this might affect performance of a Deploy job.

Forecast service 118 can combine output of the simulation service 112 and profile service 114 detailed above in order to predict failures and performance of a proposed deploy job. Forecast service 118 can return reports to job request manager 121 for entry in the database 109. The forecast service can report contains information about the success of proposed changes and performance of a deploy job of proposed changes.

Compare service 110 can compare two or more managed systems in the context of the specified integrated software component 140 or service. Compare service 110 returns a report of the differences to job request manager 121 for entry in the framework database 109.

When performing complex tasks it may be necessary to organize a series of jobs into a single job execution. Multiple job orchestration service 116 allows a user to create job groups into a single execution for the purposes of monitoring and reporting. The user can also specify certain behaviors in the event of individual job failures. For example, to deploy an application a user may configure a job to deploy the application binaries, a job to update the database schema, and a job to configure monitoring routines for the deployed application. The user can then group these jobs into a job group and specifies that if one job fails all changes already affected should be reverted. With a single request, all three jobs run. If, for example, the job that creates the monitoring routine fails, the previous two jobs are reverted and, according to one embodiment, the entire job group fails.

Job services 103 can support a variety of job types. However, if integrated software components 140 are used, not all job types will make sense for all integrated software. In the event that a specific job type has no meaning for an integrated software component 140, the API or adapter can be configured to handle requests for that job type gracefully. Furthermore, as discussed above, deploy service 107 and profile service 114 can be configured to return a meaningful report to job request manger 121. The format and content can be determined by the API or adapter 142 the integrated software employs to interact with framework 102.

Managed system service 130 allows an administrator to add, update, and delete managed system(s) in the framework database 109. Information stored about a managed system will differ based on the management system 128, service or integrated software component 140. While the information stored may vary, examples include, but are not limited to: hostname; system login (local user/group information), system specifications (e.g., memory, processing power, hard disk space, ports, etc.); available resources including resource types (e.g., Oracle Database, Apache Server, Nagios Monitoring Instance), resource instances (e.g., a system is host to 2 distinct Oracle Database instances named db1 & db2; instance access information (e.g., access credentials, access ports for each, miscellaneous connection information), database version information, such as the schema version deployed in the database.

Report service 132 is used to return reports that contain historical data about framework jobs based on parameters defined by the end user. Example parameters include: managed system name(s), success or failure, date, job type (deploy, snapshot, comparison, etc.), type of service used (e.g., database schema migration, monitoring configuration, application deployment), any of the integrated software components 140 used to date and present in framework 102).

Admin service 134 allows an administrator of framework 102 with the appropriate system privileges to manage system users and groups, system access details, and framework configuration information. This service can be used to configure various items, including, but not limited to groups (e.g., group names, members, permissions, descriptions, etc.), users (e.g., user credentials, group memberships, contact information, permissions, etc.), framework configuration information (enabled/disabled interfaces, interface connection settings (e.g., hostnames, ports, access control lists for each interface, location of framework services, connection information for framework components), software integration information (e.g., available management applications or other software, connection information, location of integration dependencies (e.g., database drivers, libraries/function archives, runtime environments), etc.) and other information.

Project services 136 may provide adding, altering and saving project contents, such as change logs, database definitions, deployment plans, rules, scripts, and lookup data.

Database 109 can be the central storage point for all data pertaining to framework 102. Examples of data are described in the service descriptions above. At a high level this data can include but is not limited to the following: user information, permission information, job execution information, job execution artifacts, reports, logs, data used in execution, managed system information, framework configuration information, software integration information and other information.

The following provides some example workflows using framework 102. First, the example of adding a new user to manage the deployment of a specific web application, SampleApp, is described. In this example, the user needs to be able to access framework database 109, the managed systems 128, and the integrated software components 140 that apply to managing the web application's deployment processes.

A framework administrator logs in to the framework 102 and navigates to the section for creating users and groups. The system administrator creates a group called 'SampleApp', which is given permission to access all of the managed systems slated for use as part of the 'SampleApp' application project. The 'SampleApp' group is given access to snapshot service 108 for the integrated software components 140 that manage the web servers, database servers, and middleware servers. This allows all members of the 'SampleApp' group to perform snapshot on managed systems associated with the 'SampleApp' project to determine the current state of the managed systems 128 of interest, but prevents them from altering the managed systems 128 by not granting permissions to the other job services. The system administrator then creates a user account for the new user. The user account is granted permission to all other job services so that the user can schedule jobs to affect change on the managed systems 128 associated with the 'SampleApp' project.

As another example, a new system to be managed is added to an organization's IT infrastructure. In this case the new system can be registered with framework 102. A system administrator logs into the web interface 150 or other interface and navigates to the managed systems tools in the interface. The manage system tools can correspond to requests to managed system services 130. The administrator selects to create a new managed system and supplies basic information such as hostname, system specifications and user information to access the system so that framework 102 can access the managed system. The administrator can also supply information about instances of resources on the managed system. For example, the administrator may indicate that the new managed system hosts a database instance and provide connection information for the database instance. The administrator may be given the option to test the connection to make sure the connection information entered is valid. The administrator may also enable configuration of the managed system by certain integrated software (e.g., enable configuration of a router by a network configuration software integrated with framework 102, enable configuration of a database by a database change management tool integrated with framework 102, etc.). The administrator can further configure permissions for users of framework 102 to access the managed system (e.g., to limit those who can configure the managed system). The new managed system is made available to authorized users to schedule jobs using the job services that utilize the enabled software integration.

In a third example, a user executes a job on a managed system. The user accesses framework 102 using a user interface and initiates a search of managed systems in order to find the managed system to test changes. On finding the managed system in the search results, the user can use the supplied controls in the interface to create a job that targets the managed system. The user then enters or specifies a document on his local machine or elsewhere that describes the changes he wishes to forecast against the managed system.

The user can submit a job request using provided user interface controls. The job request, in one embodiment, contains the following information: credentials (username & password); type of job (which framework service and which integrated software will perform the task) managed system(s) on which to perform the job, any data needed by the integrated software to affect change on the targeted managed system(s) (e.g., application binary files to deploy, a textual specification of access rules changes to make on a firewall, an xml representation of database schema changes or other change data).

The job request is routed through the access control API 162, which checks user permissions and, if appropriate, grants approval to perform the job. Access control API 162 reconciles the user's ability to perform the requested job based on permissions information in framework database 109. If the job request is denied, an access denied response can be returned to the user. If the job request is permitted, the job request is then routed through job request manager 121. Job request manager 121 determines that the job request is a Forecast request for the integration software that manages database schemas. Job request manager 121 enters the job data in the framework database 109 with a status of 'Started' and then dispatches the job to the appropriate job service for execution by the appropriate service and integrated software. In this example, the job request is dispatched to forecast service 118. Forecast service may call profile service 114 and simulation service 112 and simulation service 112 may call snapshot service 108 as needed. The job is run and job artifacts (report, logs, etc.) and a return code indicating success or failure are returned to job request manager 121. Job request manager 121 updates database 109 with the job artifacts and return code. The job status is updated to 'Complete'. The user can check the status of the job, and inspect the job artifacts.

As another example, a user can perform a job that impacts several managed systems. For example, an application deployment may touch several different systems. In this example, a user can configures a job to deploy the application binaries, a job to update the relevant database scheme, a job to configure monitoring routines for the deployed applications and then group these jobs into a job group that specifies if one job fails all changes already affected should be reverted. If the job request is allowed, the job request can be dispatched to multiple job orchestration service 116 which can coordinate dispatching the constituent jobs for execution by the appropriate services and software integrations. If any of the jobs in the job group fails, multiple job orchestration service 116 can attempt to rollback changes. The user can be alerted of the failure.

Embodiments of management system 100 can simulate changes to a managed system and predict the results of proposed changes. Simulation service 112 can create or maintain a model 180 of the current configuration of a managed system 128. In some cases, the initial model 180 may be provided. In other cases, the initial model 180 may be built using information from snapshot service 108 or profile service 114. In some embodiments, the information may be collected by snapshot service 108 or profile service 114 using integrated software components 140. For example, according to one embodiment, snapshot service 108 can query an integrated software component 140 for a current state of managed system 128 and return the current state to simulation service 112 so that simulation service 112 may build a current state model 180. The information may be provided in any suitable format consumable by simulation service 112. In one embodiment, snapshot service 108 may provide the current state of a managed system as a set of changes required to produce the current state. In this case, simulation service may build an initial model 180 and simulate proposed changes to model 180 in the same manner.

Model 180 can model various configurable elements of managed system 128 and the relationships between the configurable elements. Depending on the managed system, configurable elements may be any logical or physical aspect that may be defined, modified, removed or otherwise configured on a managed system 128. Examples of configurable elements may include elements of a database schema, database constraints, firewall rules, connections, hardware elements or other configurable aspects of managed system 128. Relationships represent relationships between configurable elements. Any number of parameters may be maintained for a configurable element or relationship. In some embodiments, model 180 can be an object model in which configurable elements are represented by objects and relationships by the relationships between objects.

To simulate a change, simulation service 112 can receive a change log 185 that specifies changes to the configurable elements or relationships. Simulation service 112 can translate the changes into commands on model 180 and evaluate the results of the commands against a set of rules to determine if the commands result in an error. The rules can include rules that would be enforced by the underlying managed system 128 on the configurable element and permissions. The rules may also include user defined rules. Simulation service 112 may also use profile information returned by profile service 114 to determine the impact of a change.

As the commands are run, model 180 can be updated and the results of the simulation provided to forecast service 118, which can report the results. Forecast service 118 can generate a log or report of the results of the proposed changes using the output of simulation service 112 and profile service 114. If the simulation results in no errors (or acceptable errors), the proposed changes can be deployed to the managed system.

Turning now to database change management, management system 100 can be configured as a database change management system that facilitates authoring and migrating database structure/schema changes from one database to another. Management system 100 may perform database schema management according to a deployment plan 190 that defines where databases are logically located and connection information for the databases. Deployment plan 190 represents the general flow of schema changes and contains database definitions having information needed to connect to and inspect databases of interest and one or more steps describing the flow of changes from one database to another. The chain of database definitions and steps is not necessarily linear or a directed acyclic graph. The links of steps may converge, branch or be cyclic. One example of an interface for defining a deployment plan is discussed in conjunction with FIG. 11, below.

The user can submit proposed changes, which can be stored in a change log 185 for the project. Change log 185 can include changesets. A changeset defines the changes to be made to managed system 128 and includes operations that are executed against the target database. A changeset may also include instructions to reverse changes. A changeset may be equivalent to one or more SQL statements, but represented in a database-neutral format. In other embodiments, a changeset can be specified in or include SQL or other query language statements. One embodiment of an interface for providing a changeset is discussed in conjunction with FIGS. 12A-12D.

According to one embodiment, snapshot service 108 can query the current state of a managed database schema and output a representation of the schema. As would be understood by those of ordinary skill in the art, a database server can provide a listing of database schema objects in response to one or more quarries. Thus, by querying a database, snapshot service 108 can determine, for example, the tables, columns, constraints and other schema objects to produce a snapshot of a database. The snapshot may be in a form consumable by simulation service 112 or other service. The schema objects provided in the snapshot can be mapped to a model of the schema.

According to one embodiment, snapshot service 108 may utilize an integrated software component 140 to retrieve the schema snapshot. Liquibase, for example, can output a snapshot of a schema as a set of changes required to create the schema. In this case, the appropriate changesets can be stored in change log 185, representing the current state of the database. Proposed changes entered by the user can be appended change log 185.

Profile service 114 can augment data provided by snapshot service 108 with any other data that might impact the application of changes. According to one embodiment, for example, profile service 114 may connect to a managed database, read information from the schema as well as summary information about data stored and record profile information 195 in framework database 109 or other data store. Examples of information that may be provided by profile service 114 include, but are not limited to, row counts of data tables, database engine parameters such as buffer sizes, memory allocation, file system implementations, table types, permission models (which users have permission to change which structures). Profile service 114 may also test database performance by recording the time it takes to perform database operations. Profile service 114 can provide a schema snapshot and light-weight data profile (e.g., row counts and permission model) of a database useful for forecasting the performance of database changes.

Additionally, simulation service 112 can simulate the application of changesets on a database by running changes against a model 180. Model 180 may be provided by a user, another service or application. In other embodiments, simulation service 112 may build model 180 representing the baseline profile against which changes may be made and apply proposed changes to the model. One example of a model is discussed in conjunction with FIG. 4.

To build the model 180, simulation service 112 can map schema objects as described in the snapshot to representations of the schema objects in the model. If the schema objects from the snap shot are represented by changesets, simulation service 112 can process change log 185 to build the baseline model 180 from the snapshot changeset. Simulation service 112 can further process change log 185 to simulate proposed changes against model 180. One example of building and updating a model is discussed in conjunction with FIGS. 5A-5D and FIG. 6.

According to one embodiment, simulation service 112 can map proposed changes to a database to commands run against model 180 of the database to determine the impact of the changes. Simulation service 112 can predict any errors or failures a deployment might encounter based on the application of rules to the proposed changes. For database schema changes, the rules applied can model rules used by the underlying database. Simulation service 112 may also use the permission model provided by profile service 114 to predict the failure of an operation due to insufficient user permissions. Job information (e.g., logs, return codes, model of predicted system state, and errors) may be entered in the framework database 109.

Forecast service 118 may combine output from simulation service 112 and profile service 114 to predict failures and performance of a proposed deploy job. Forecast service 118 may return a report for entry in the framework database 109. In the case of database schema changes, it may combine results of the simulation of proposed database changes to the database model and profile information in order to predict failures and performance. Forecast service 118 can use row counts or other information to predict long-running operations and operations which destroy or alter large amounts of data. The row counts coupled with database engine parameters, table types and database performance metrics allow forecast service 118 to predict the time it takes to perform the proposed changes in change log 185. The row counts combined with the changes, in some cases, can be sufficient to warn the user about amount of data altered or destroyed.

Deploy service 107 can act as a schema migration service to effect changes in change log 185 to a managed database. In some embodiments, the user provides identifier(s) for the managed system(s) targeted and the data necessary to perform the desired change in a text, xml, or similar document, as SQL or other queries or in another format. Deploy service 107 then may attempt to execute the change and return whether the change succeeded or failed, as well as descriptive information about the job (logs, reports, return codes, etc.). In the event of the failure, a rollback function may be implemented to revert all changes made by the job up to the point of failure.

According to one embodiment, deploy service 107 can connect to a database, lock the database (e.g., to prevent another service from making changes) and inspect the managed database or framework database 109 to determine which changes sets in change log 185 have been run on the managed database. As would be understood by one of ordinary skill in the art changes, such as adding, modifying and removing schema objects can be mapped to one or more SQL commands. Accordingly, deploy service 107 can assemble the appropriate SQL commands (e.g., SQL DDL commands or other commands) for the unexecuted changesets, issue the commands to the managed database. It can be further noted that deploy service 107 may use an integrated software component 140 to issue commands. In this case, deploy service 107 can provide the changes to the integrated software component 140 making the appropriate requests or calls if necessary, to cause integrated software component 140 to issue the appropriate SQL commands.

Deploy service 107 may also issue commands to reverse changes if needed. Deploy service 107 can record the execution of changes in the managed database or framework database 109 (e.g., in a changelog table or other data structure). Deploy service 107 can create a report and populate a log with the results of the deployment.

While management system 100 is provided as one embodiment of a database change management system, a database change management system may be implemented according to any suitable hardware or software architecture. Furthermore, embodiments of management system 100 may be configured to provide other types of systems management.

Figure 2:
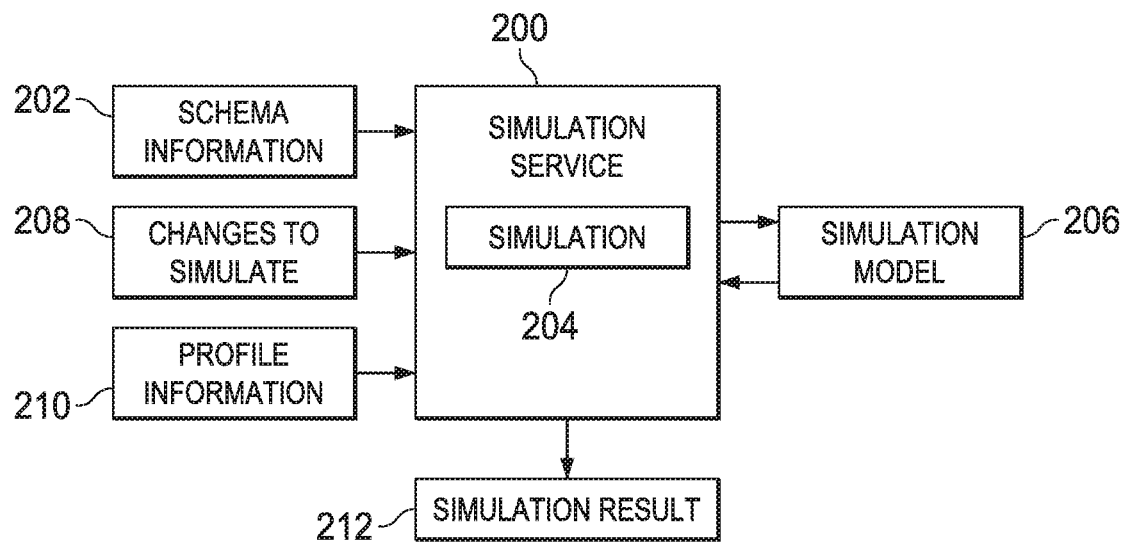
FIG. 2 is a diagrammatic representation of one embodiment of a simulation service.

FIG. 2 is a diagrammatic representation of one embodiment of a simulation service 200 that simulates changes to a database schema. Simulation service may be implemented part of a database change management system, including a database change management system as discussed in conjunction with FIG. 1 (e.g., as an embodiment of simulation service 112) or by another database change management system. Simulation service 200 may include one or more simulation engines. In general, a simulation engine can be a package or library of computer code or instructions responsible for aspects of running a simulation. The simulation engine(s) simulate changes to a database structure, recording events and messages, and generate report structures for output. The rules applied by a simulation engine in performing a simulation may model the rules applied by the underlying database, user defined rules, permissions and other rules.

Simulation service 200 can be implemented with one monolithic engine or several smaller engines or libraries chained together. In the latter scenario, a parent engine, in one embodiment, delegates changes to each or some of its collaborative engines and aggregates their output at the end of the simulation, returning it to the caller of the service. This modular approach to building the simulation service allows speedy development and flexibility of design and implementation. Engines may be built from different libraries, different programming languages and different programming paradigms (structured, object-oriented, or functional) as needed.

Simulation service 200 may access an existing model 206 of a database schema or receive a set of schema information 202 and build model 206 of the database schema. Schema information 202 can provide information on the identities and parameters of schema objects in a database schema. As is understood by those of ordinary skill in the art, there are a variety of ways that a database change management system can collect such information from a database and such information may be presented in a variety of ways. According to one embodiment, schema information 202 may include a set of snapshot changesets specifying the changes that would be required to create the database schema from an empty schema. Simulation service 200 can map the schema information 202 to model 206. Preferably, model 206 may be a database neutral model representing a schema, tables in the schema, columns, constraints or other database objects.

Simulation service 200 may also receive proposed changes to simulate 208. If schema information 202 is also provided as changes, changes to simulate 208 and schema information 202 may be received as a change log including snapshot changesets representing the baseline state of the database schema and changesets representing proposed changes. In other embodiments, schema information 202 and changes to simulate 208 may be received according to other formats.

Simulation service 200 runs a simulation 204 that models the application of changes to simulate 208 from the change log in sequence. If schema information 202 is provided as changes, simulation service 200 can build a baseline simulation model 206 and execute the proposed changes, modiillustrated. Changelog 304 is a container for one or more Changesets 306. A Changeset is container for one or more Changes 310. A Change 310 contains a type of change 312 that maps to operations that can be executed in the database being managed. The types of changes 312 can depend on the type of database being managed or the changes supported by the snapshot service or other component that provides changesets.

A change log can be persisted as an XML file or other format. The following provides one example of a change log.

```
<?xml version="1.0" encoding="UTF-8"?>
<databaseChangeLog xmlns="http://www.liquibase.org/xml/ns/dbchangelog"
    xmlns:xsi="http://www.w3.org/2001/XMLSchema-instance"
    xsi:schemaLocation="http://www.liquibase.org/xml/ns/dbchangelog
                        http://www.liquibase.org/xml/ns/dbchangelog/dbchangelog-3.0.xsd">
    <changeSet id="1" author="jenkins">
        <createTable tableName="first_table">
            <column name="id" type="int">
                <constraints primaryKey="true" nullable="false"/>
            </column>
            <column name="name" type="varchar(50)">
                <constraints nullable="false"/>
            </column>
        </createTable>
    </changeSet>
    <changeSet id="2" author="Pete">
        <createTable tableName="new_table">
            <column name="id" type="int">
                <constraints primaryKey="true" nullable="false"/>
            </column>
        </createTable>
    </changeSet>
</databaseChangeLog>
``` fying simulation model 206 in volatile memory. In performing simulation 204, simulation service 200 may access profile information 210 including, for example, row counts of data tables, database engine parameters such as buffer sizes, memory allocation, file system implementations, table types, permission models (which users have permission to change which structures.) Such information may be included in the model 206 or be used to determine whether or not a particular change would cause an error. For example, simulation service 200 may access the permission model to determine if the author of a change has the rights to make the change and, if not, generate an error when the change is applied to model 206.

Simulation service 200 can determine if a change would result in an error. The determination of whether an error would result may be based on applying the same rules as would be applied to schema changes by the underlying database, user defined rules or other rules. For example, a command to drop a table or column that does not exist may result in an error. As another example, an attempt to make a primary key column nullable when the managed database does not support non-null primary key column entries may result in an error. Simulation service 200 can return a simulation result 212 that includes a prediction of failure of changes that, as authored, cannot succeed.

Figure 3:
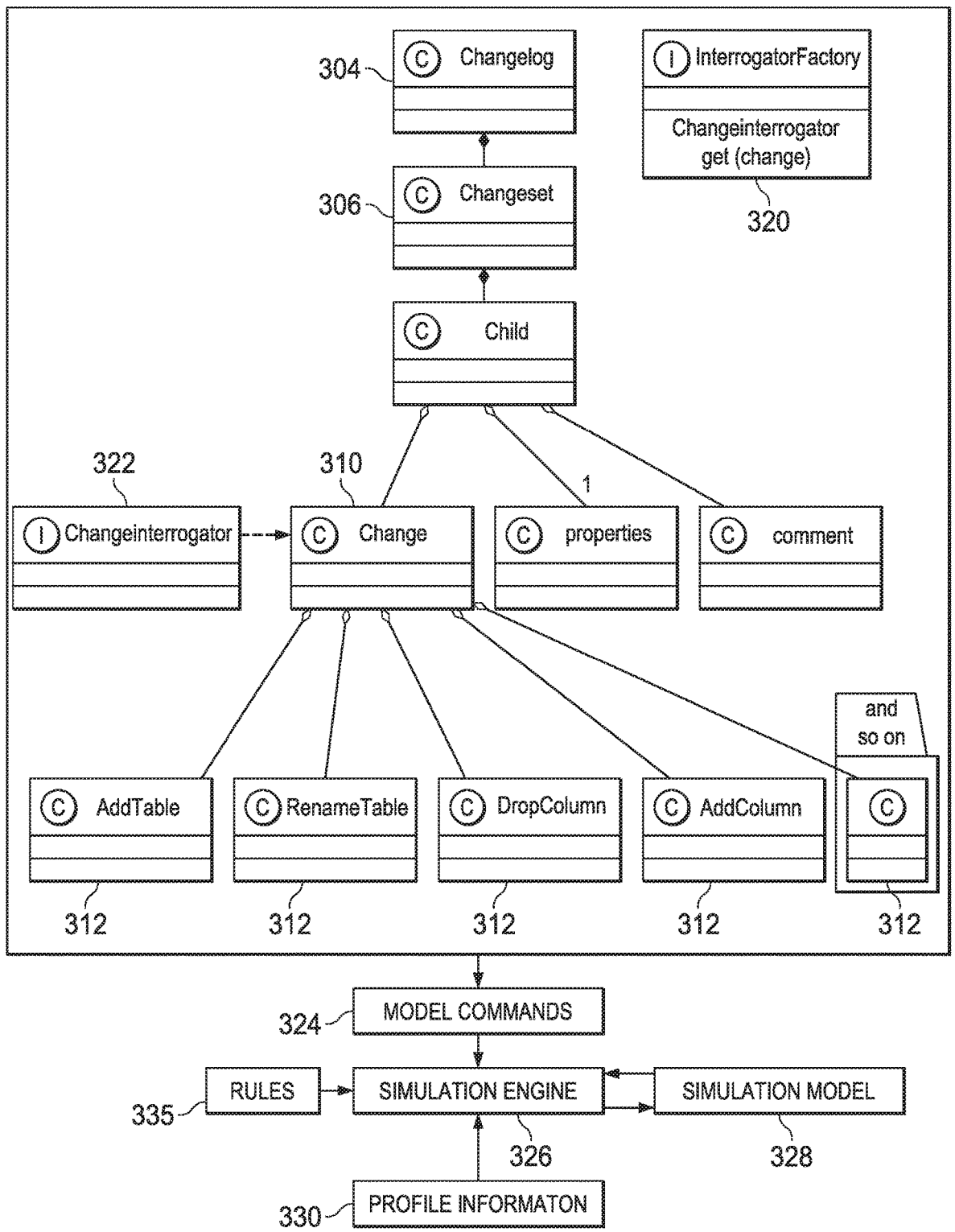
FIG. 3 is a diagrammatic representation of one embodiment of processing a change log.

FIG. 3 is a diagrammatic representation of one embodiment of processing a change log 302 by a simulation service, such as simulation service 200 of FIG. 2. According to one embodiment, a change log 302 may be provided according to a defined data model. In the example of FIG. 3, one embodiment of a class diagram for a change log 302 is The simulation service can hold a sequence of change log elements in memory, for example RAM, and map the elements of change log 302 to commands 324 against simulation model 328 according to defined mappings. According to one embodiment, the simulation service can include an interrogator factory 320 that can inspect each change in change log 302 and map each change to an interrogator object 322 to create an appropriate command. The interrogator object 322 can be an instance of a decorator class that provides a common interface to disparate wrapped classes. For example, the interrogator classes can be used to wrap change classes so that they can be used by the same code. The use of interrogator factory 320 and interrogator objects 322 is provided by way of example and not limitation and change log elements can be mapped to commands executable on the model (e.g., model 206 of FIG. 2) according to any suitable mapping.

In executing commands 324, simulation engine 326 manipulates internal data to simulate the database schema. Manipulations include but are not limited to creating a schema model; adding a new table to a schema model, changing the name of a table, removing a table, modifying parameters of a table, adding a view to a schema model, removing a view from a schema model, renaming a view, modifying parameters of a view, adding a column to an existing table, removing a column from a table, changing the name of a column, changing the parameters of a column, adding a constraint to an existing table, removing a constraint from a table, changing the name of a constraint, changing the parameters of a constraint.

Simulation engine 326 may determine if a command violates a set of rules 335, including permission rules (e.g., as determined by a permission model from profile information 330), rules specified for the managed database (e.g., a primary key column cannot be null) or results in an error. If errors are encountered, the errors may be logged. For example, a command to drop a table or column that does not exist may result in an error. As another example, an attempt to make a primary key column nullable when the managed database does not support non-null primary key column entries may result in an error. In some cases, errors may be recorded, but the simulation continued to update the simulation model. In other cases, the simulation can stop when an error is encountered or other criteria met.

Simulation engine 326 can log warnings or errors associated with the changes that caused them and the context of the error including the state of the model at the time; performance of the change (time duration, number of rows viewed, number of values viewed, number of rows deleted, indices rebuilt); necessary security permissions or violations of permission settings; results of applying user-defined rules; advice for the user based on common usage patterns; effects of parameter substitution and context-sensitive changes; generation of instructions and schema objects based on included data files.

Figure 4:
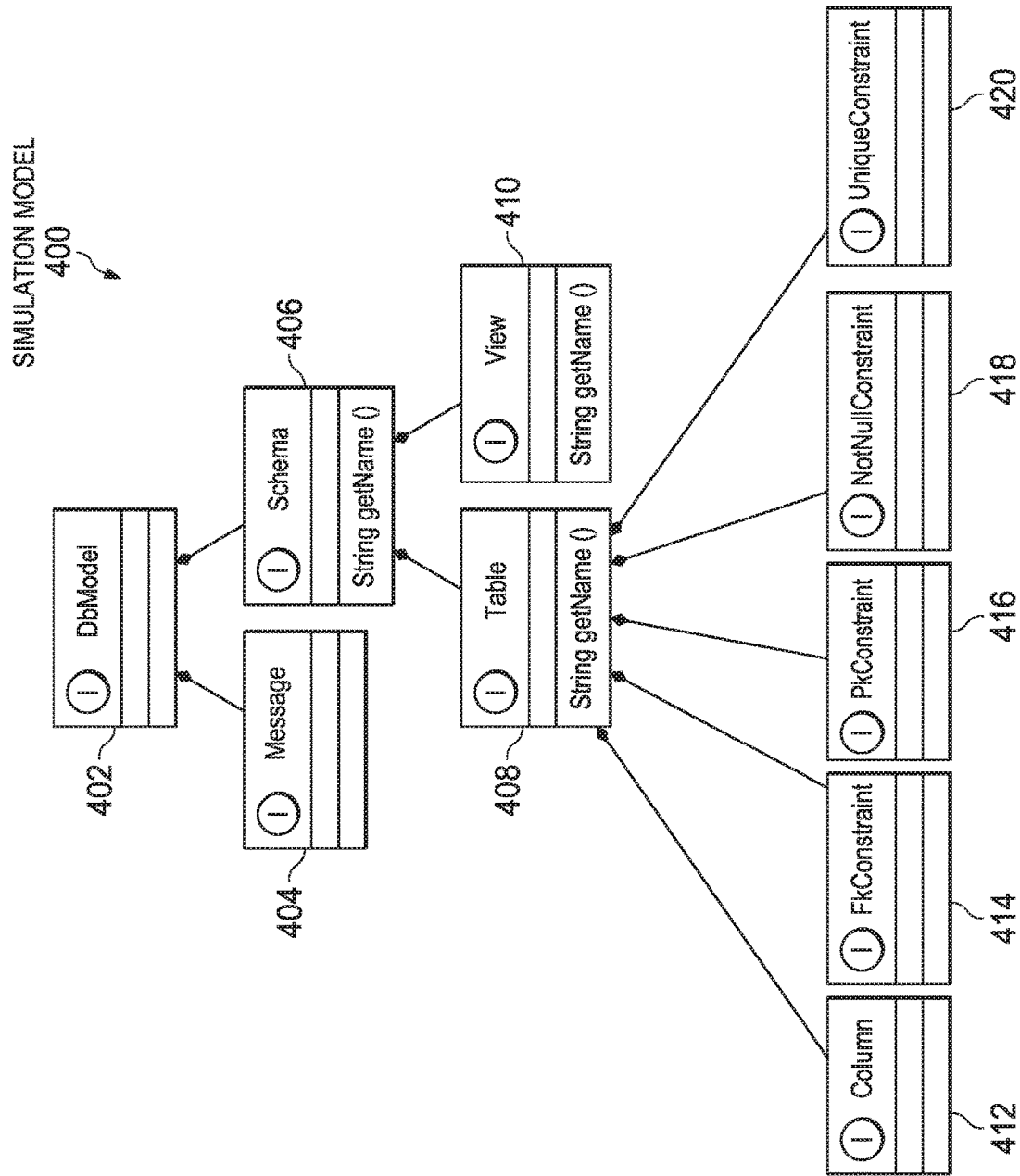
FIG. 4 is a diagrammatic representation of one embodiment of simulation model.

FIG. 4 is a diagrammatic representation of one embodiment of a simulation model class diagram 400. In the example shown, DbModel 402 is a root level object through which the simulation output may be accessed. In particular, DbModel 402 gives access to schema models 406 and messages 404.

In some embodiments, messages 404 represent a message for the user, for example, indicative of errors encountered during the simulation; performance descriptions, such as number of rows read, rows changed or values deleted; and suggestions for schema changes, such as adding an index on a foreign key that does not yet have an index.

Schema models 406 are models of a schema of a database. Schema models 406 may include Tables 408, views 410, sequences, and other schema objects. A Table 408 describes a table in a database. In some embodiments, a Table 408 can reference a row count as provided by a profile from the profile service. A Table 408 may reference vendor-specific or engine-specific tuning parameters. A Table 408 may be related to one or more Columns 412, which models a column in a database.

Tables 408 may also be related a variety of constraints 414-420. FkConstraint 414 models foreign key constraints on columns in a Table 408. PkConstraint 416 models a primary key constraint on a Table 408. NotNullConstraint 418 models a data constraint on a column on a Table 408 requiring the data to be filled out as something other than NULL. UniqueConstraint 420 models a data constraint on a column requiring the column to have unique data for every row in the table.

FIG. 4 provides one example of a database neutral model, though other models may be used. A database neutral model facilitates comparing schemas of multiple databases, including databases of different types. A baseline model for a database schema may be provided or built. According to one embodiment, a database change management system may receive a set of schema information and create a baseline schema model according to FIG. 4 or other model. The database change management system may process snapshot information to build a model, though for a new database the schema model may be empty. In one example embodiment, changes in a change log to add, remove or modify tables, columns or constraints can be mapped to commands executable on the model to add, delete, modify tables, columns and constraint objects from the model.

Moreover, the simulation model does not require replicating the record data from tables and can be relatively small compared the size of the database. Even for relatively large databases, the model can be manipulated in memory.

While the foregoing example simulation model illustrates objects for tables, columns and constraints, other database objects may also be represented including but not limited to views, stored procedures, functions, triggers, check constraints, materialized views, synonyms, types, packages, sequences or any other object in the database. By way of example, but not limitation, a view object ray be related to a schema, table, another view or materialized view, a trigger, a constraint, a grant, a package, a sequence and include the view definition, dependencies on other objects; a stored procedure object may be related to any object in the database and include instruction code and references to other objects; a function object may be related to any object in the database and include instruction code and references to other objects; a check constraint object may be related to a table, view, materialized view and include the instruction code implementing or describing the constraint and references to any other object in the database; a trigger object may be related to a table, view, materialized view, a schema, a catalog or the entire database and include instruction code implementing or describing the trigger and references to any other object in the database; a sequence may be related to any other object in the database and may include instruction code implementing or describing sequence and references to other objects in the database.

Figure 5A:
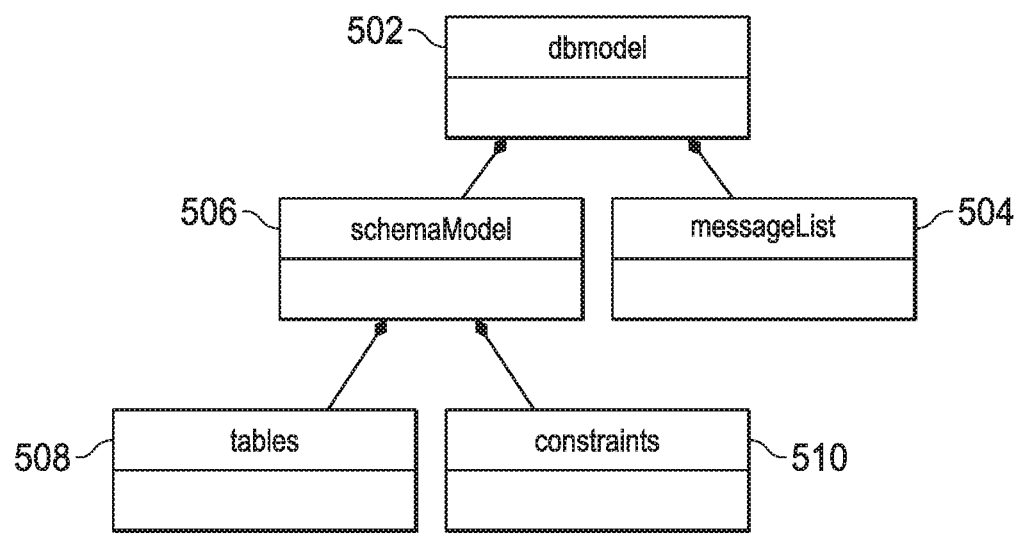
FIGS. 5A, 5B, 5C and 5D illustrate one example of updating a simulation model.
Figure 5B:
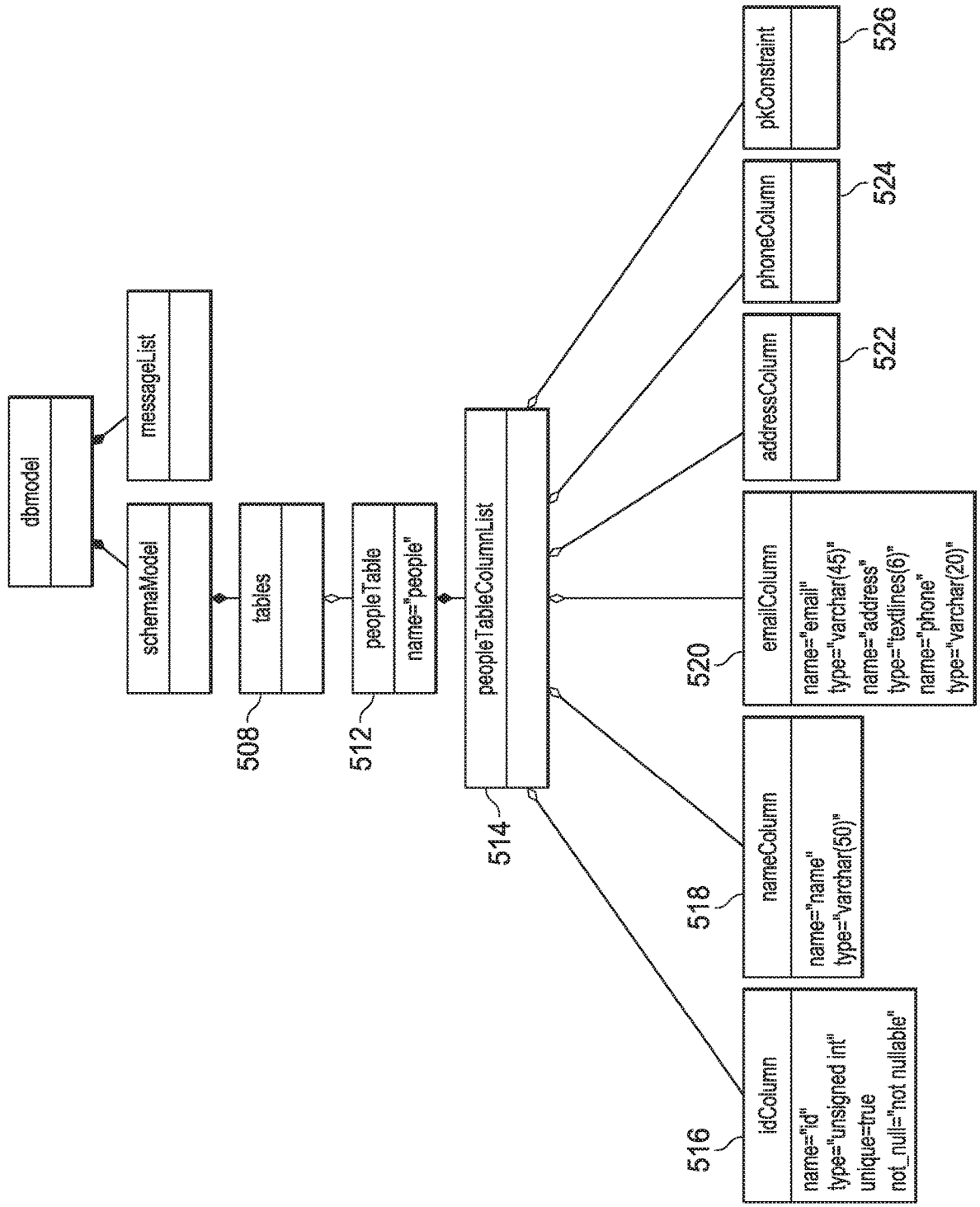
Figure 5C:
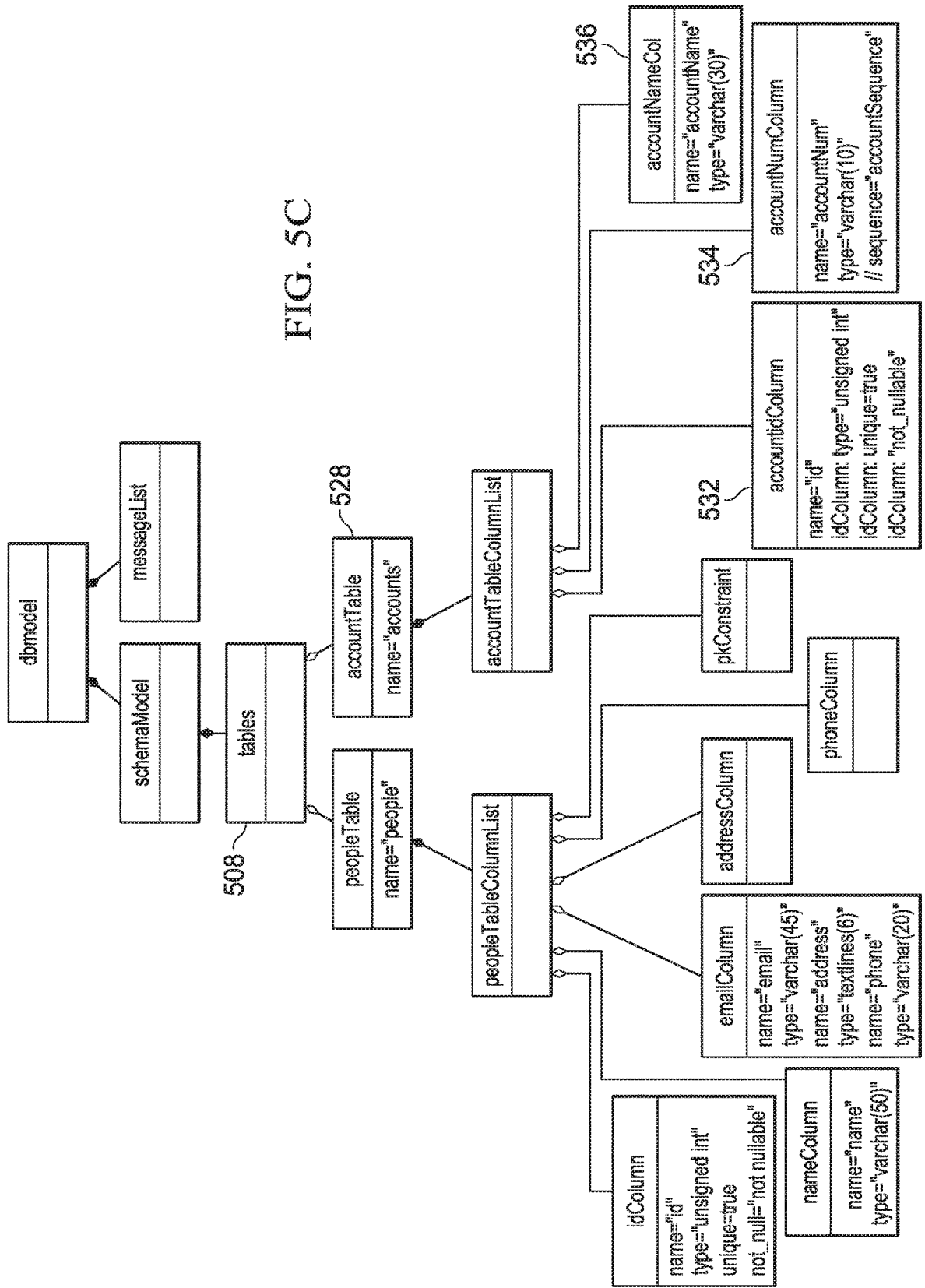

FIGS. 5A-5C are diagrammatic representations illustrating one embodiment of creating or modifying a simulation model. In the example illustrated, the following hypothetical set of changes (e.g., represented in changesets) are considered: (1) add table "People" with an "id" column, "name" column, "email" column, "address" column and "phone" column; (2) add table "Account" with an "id" column, "accountNum" column and "accountName" column; (3) add column "accountid" to table "People"; (4) Add foreign key constraint "PeopleAccountID" to "People" table.

The simulation service begins the simulation with change elements and an empty model in memory. FIG. 5A provides a diagrammatic representation of one example of an empty model. In the example illustrated, the empty model includes a dbmodel 502; associated schemamodel 506, including tables 508 and constraints 510; and messageList 504.

With reference to FIG. 5B, to (1) add the "People" table, the simulation service constructs the peopleTable object 512 and column models idColumn 516, nameColumn 518, emailColumn 520, addressColumn 522, phoneColumn 524, and pkConstraint 526. The simulation service further adds a reference to peopleTable 512 to the tables list 508 of the schemamodel 506 and a reference to column models idColumn 516, nameColumn 518, emailColumn 520, addressColumn 522, phoneColumn 524, and pkConstraint 526 in the associated peopleTableColumnList 514.

With reference to FIG. 5C, to (2) add the "Accounts" table, the simulation service constructs accountsTable object 528 to represent the "Accounts" table and column objects accountColumn 532, accountNumColumn 534, and accountNameCol 536. The simulation service adds the accountTable object to the list of tables 508 in the schema and a reference to column object accountColumn 532, accountNumColumn 534, and accountNameCol 536 in accountTableColumnList 530.

Figure 5D:
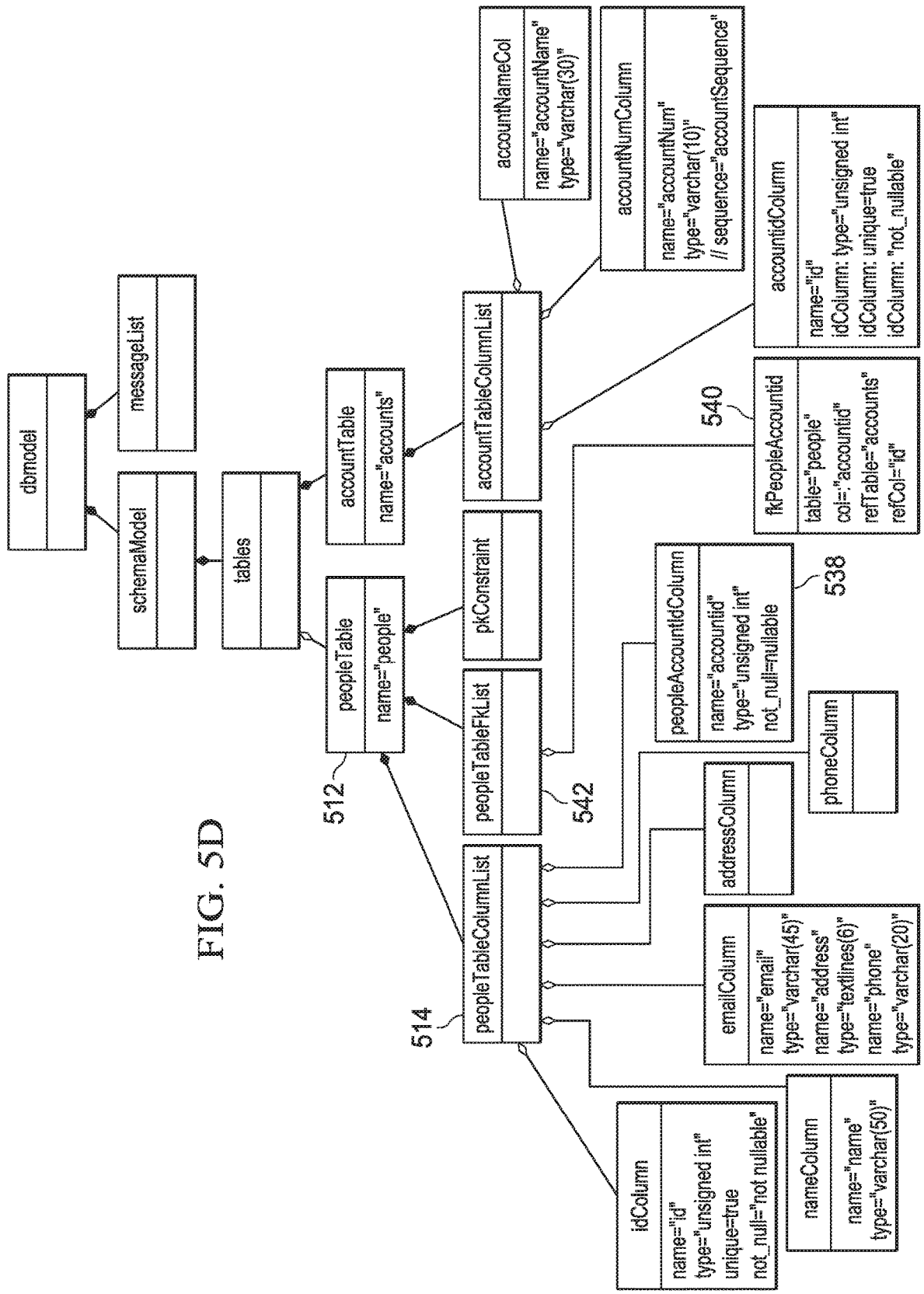

As shown in FIG. 5D, to (3) add column "accountid" to the "People" table, the simulation service constructs peopleAccountIdColumn 538 and adds a reference to peopleAccountIdColumn 538 to list 514 of columns for the peopleTable object 512. Finally, to (4) add foreign key constraint "PeopleAccountID", the simulation creates the foreign key constraint object fkConstraint 540 and a reference to a list of constraints 542 for the peopleTable object 512. When the simulation is complete, the model can be returned to the caller of the service. In some cases, for example, the caller may be a forecast service or other service or application.

Embodiments allow for simulation of new databases as well as established databases. In one embodiment, for established databases, the current schema is read from the database and saved as a change log. This change log is used for the project. The simulation service can append additional changes to the change log or insert them in the middle of the change log. While in the above example the database model is built from the change log, the baseline schema model may also be built by traversing the database schema, processing other data structures that reveal the database schema or using other database modeling techniques known or developed in the art.

It can be noted that change steps may be specified with SQL fragment text. In some embodiments, the database change management system may be provided with language grammars, recognizers and parsers to interpret the text, build command parameters and model the effect the changes will have on the schema when run on the actual database.

Figure 6:
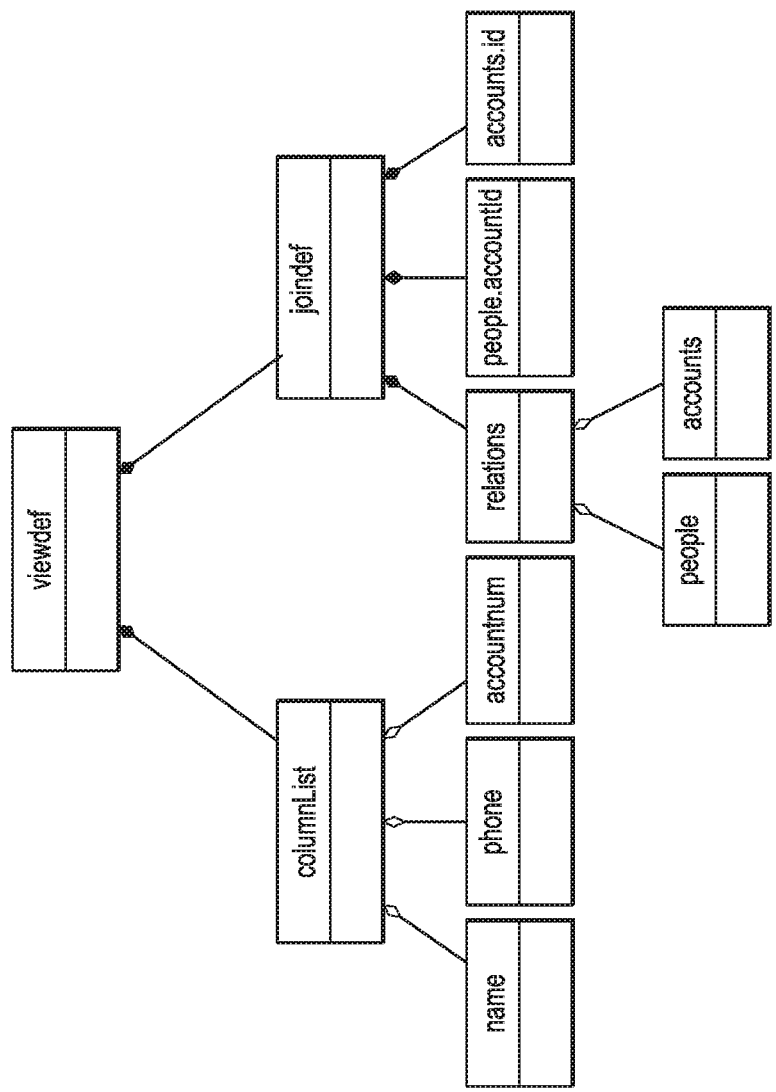
FIG. 6 depicts a diagrammatic representation of an abstract syntax tree according to one embodiment.

As would be understood by those of ordinary skill in the art, in some cases mapping an SQL operation or set of operations to a command on a model can be relatively straightforward. However, other operations may be more complex. For example, a change to create a view may be largely specified with SQL fragment(s) such as:
SELECT name,phone,accountnum
FROM people JOIN accounts ON people.accountId=accounts.id The simulation service can use a modified SQL parser, grammar and recognizer to construct an abstract syntax tree (AST). The AST can be reduced to an in-memory model of the meaning of the SQL fragment. FIG. 6 is a diagrammatic representation of one embodiment of an AST. The simulation service can then verify the contents of the AST against the database model of tables and columns. For example, if tables or columns represented in the AST do not appear in the schema model, an error can be generated.

If no errors are detected, the database model can then be amended with a new view object with three columns: name, phone and account number. In the example of FIG. 6, the columns of the view are the same as described by their tables.

Figure 7:
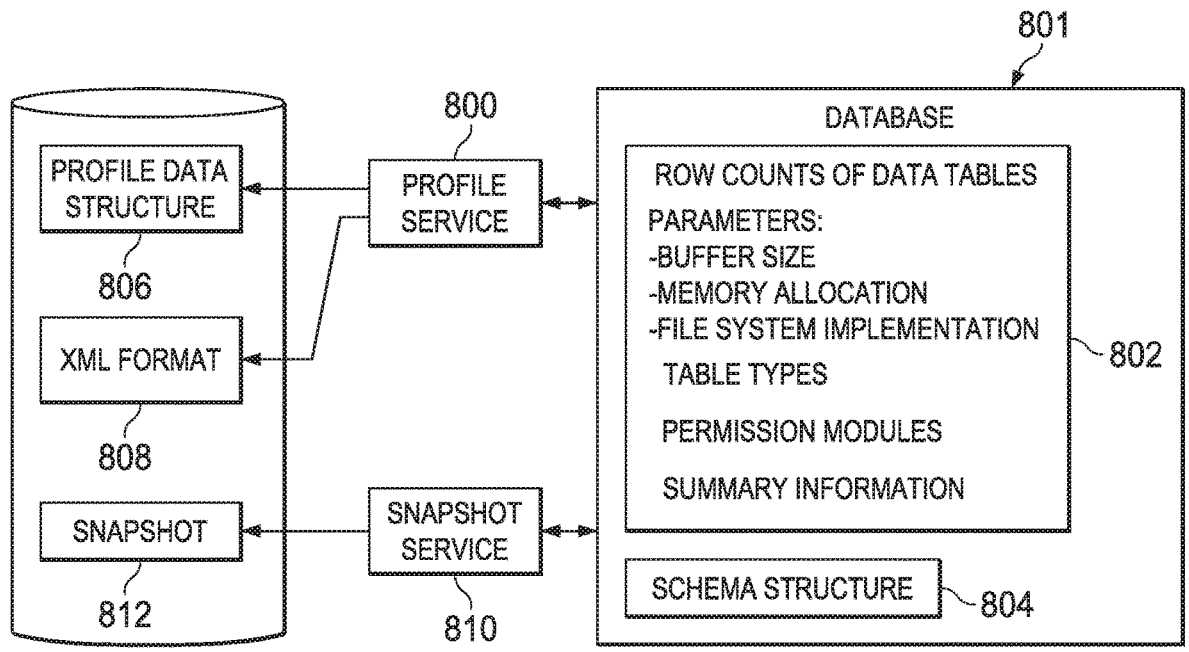
FIG. 7 depicts a diagrammatic representation of an example a profile service and a snapshot service.

Turning now to FIG. 7, shown is a diagram schematically illustrating an example profile service 800 and snapshot service 810. The profile service 800 may be an embodiment of the profile service 114 of FIG. 1 or other profile service and snapshot service 810 may be an embodiment of snapshot service 108 of FIG. 1 or other snapshot service.

Profile service 800 provides for capturing database information 802 about a database 801. Information captured may include the schema structure 804, as well as additional information 802 that may be used for predicting the success or failure of applying a change log (i.e., a collection of changesets) to that database. This database information 802 may include, in one embodiment: row counts of data tables; database engine parameters such as buffer sizes, memory allocation, file system implementations; table types such as innodb, myisam; permission models (i.e., which users have permissions to change which structures); and tests of the database performance (i.e., records of the time it takes to perform database operations).

As shown in the figure, profile service 800, according to one embodiment, connects to a database 801, e.g., using JDBC (or other database connectivity); reads information from the schema 804 as well as the additional information 802 about the data; and records the information in a profile data structure 806 and/or in XML format 808 on disk or other storage. The recorded profile from the profile service 800 may be used by a simulation service and a forecast service or other service. The simulation service and forecast service can use row counts or other information to predict long-running operations and operations which destroy or alter large amounts of data. The row counts coupled with database engine parameters, table types and database performance metrics may allow the simulation service and forecast service to predict the time it takes to perform the changes in the change log. The row counts combined with the changes may warn the user about amounts of data altered or destroyed. A permission model may be used for the simulation and forecast service to predict the failure of an operation due to insufficient user permissions.

Snapshot service 810 can connect to a database using JDBC or other mechanism and inspect the schema of the database. Snapshot service can provide a snapshot 812 of a schema (e.g., which may be used as schema information 202). Snapshot 812 can provide information on the identities and parameters of schema objects in a database schema. As is understood by those of ordinary skill in the art, there are a variety of ways that a database change management system can collect such information from a database and such information may be presented in a variety of ways. Snapshot service 810, according to one embodiment, can use the Liquibase engine for generating snapshots of a database. In other embodiments, other schema generation engines known or developed in the art may be used or snapshot service 810 can query the database for the schema objects. Snapshot 812 may include a set of snapshot changesets specifying the changes that would be required to create the database schema from an empty schema.

Figure 8:
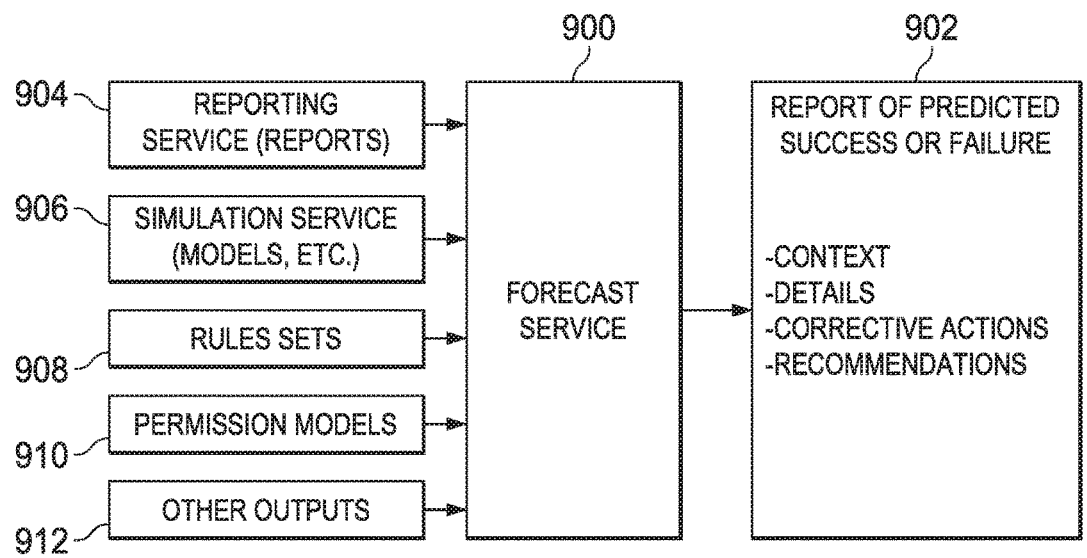
FIG. 8 depicts a diagrammatic representation of one embodiment of a forecast service according to an embodiment.
Figure 9:
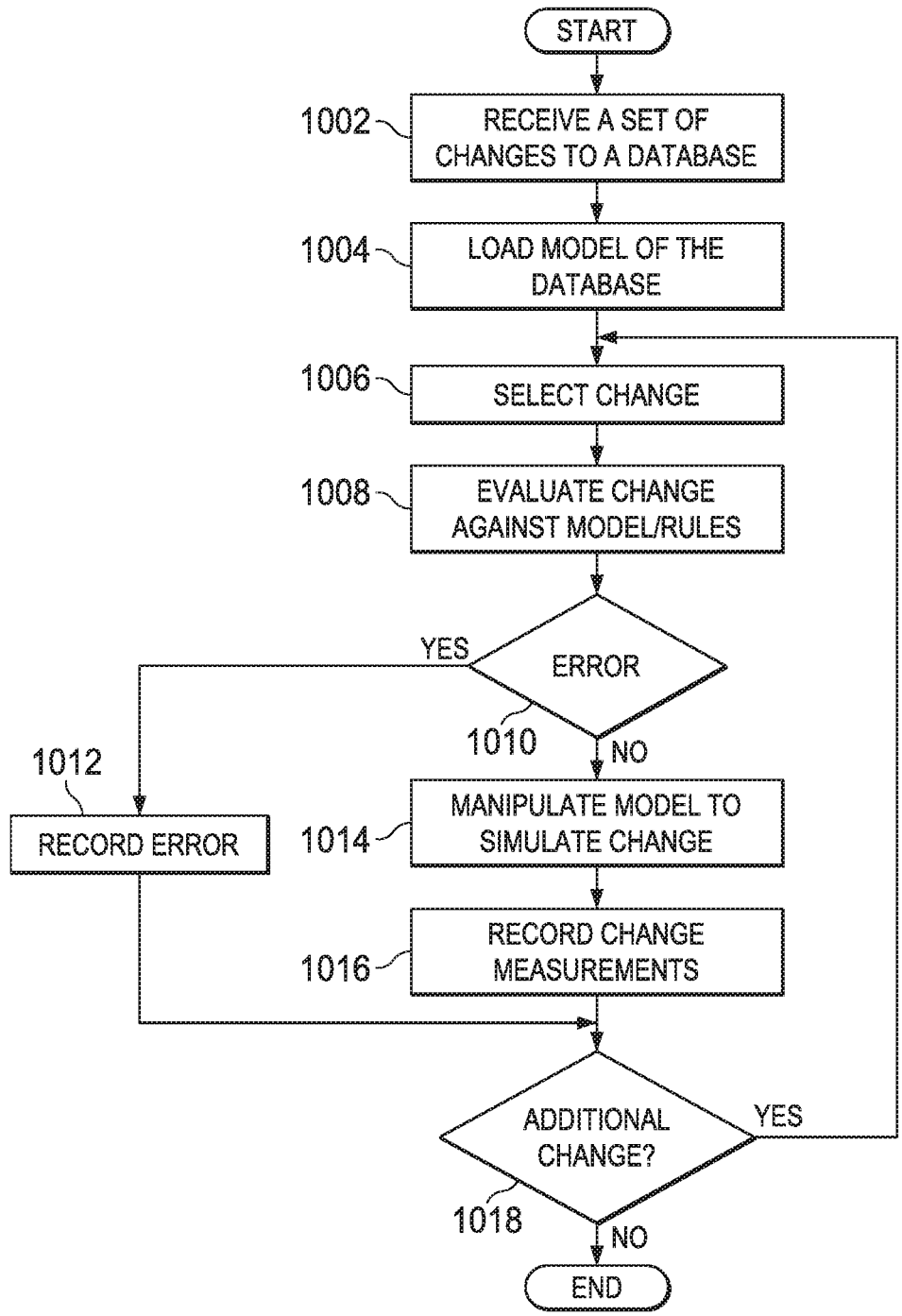
FIG. 9 is flow chart illustrating one embodiment of a method for simulating a database schema change.

FIG. 8 is a diagrammatic representation of one embodiment of a forecast service The forecast service 900 can receive reports from a reporting service 904, models and other output of the simulation service 906, profiles from the profile service 903, rules sets as defined by the user 908, permission models 910 and other inputs 912 to generate an HTML report (or other type of report) 902 predicting the success or failure of the changes in the change log accompanied by context, details, corrective actions and recommendations. According to one embodiment, the depth of information gathered during the simulation and forecast process and delivery of the report allows for a report containing the contexts of changes, entity-relationship diagrams, animations and interactive capabilities based, for example, on javascript and HTML5. According to one embodiment, the report can be viewed in an HTML browser embedded in the application as well as third party browsers launched from the application via the operating system FIG. 9 is a flowchart illustrating one embodiment of a simulation process. According to one embodiment, the steps of FIG. 9 may be implemented by a database change management system. At step 1002 a set of changes for a database can be received, for example as changesets from a change log. A model of the database schema of the database to be changed can be loaded (step 1004). In some cases, the model may be empty and can be built from snapshot data, including, in some cases from a set of changes.

The database change management system may select one of the changes from the change log (step 1006) and evaluate the change against the simulation model and rules (step 1008). If an error is detected (step 1010), an error may be recorded (step 1012). However, if no error is detected, then the simulation model is manipulated to simulate the change (step 1014) and change measurements may be recorded (step 1016). In some embodiments, the model may be manipulated to simulate a change even if an error is recorded. This process may be repeated for each change (step 1018).

If an error is generated (step 1012), the simulation service may terminate the simulation, record the error and process the next change without manipulating the model for the change or generate the error and manipulate the model according to the change. Whether the simulation is stopped or model updated to reflect a change in light of an error can be a matter of configuration and may depend on the type of change and error encountered. The steps of FIG. 9 may be repeated as needed or desired, performed in different orders. Some steps may be omitted and additional steps added.

The rules for determining whether a change will result in an error can include rules similar to those that would be applied by an underlying database, user defined rules or other rules. The following provides some example embodiments of evaluating changes. According to one embodiment, if a change is requested to add a table, the model of the database can be evaluated to determine if a table object already exists in the schema model. If so, an error can be generated. Otherwise a representation of the table can be added to the model.

If a change is requested to remove a table, the model can be evaluated to determine if a table object for the table exists in the model. If not, an error can be generated. If a table is represented in the model, the representation of the table can be removed or the model further evaluated before removal. For example, if a table is associated with columns in the model, an error can be generated because some database systems do allow deletion of tables without deletion of columns or it may be desirable to warn a user that a change will delete a non-empty table. In another embodiment, an error can be generated if the columns referenced by the table object are also referenced by a constraint. For example, it may be desirable to generate an error if a column in a table is referenced by foreign key constraint to maintain integrity in the database. In some cases, the representation of the table may be removed from the simulation model, even if an error is logged.

If a change is requested to add a column, the model of the database can be evaluated to determine if the table to which the column is to be added is represented in the model. If the model does include a representation of the containing table, an error can result. If a change is requested to remove a column, the model can be evaluated to determine if the column is represented in the model and, if not, an error generated. If the column is represented, the representation of the column can be removed from the model or the model further evaluated. For example, if a column is referenced by a constraint, an error may be generated. This can prevent removing a column in a table that is referenced by a foreign key constraint in another table. In some cases, the representation of the column may be removed from the simulation model, even if an error is logged.

If a change is requested to add a constraint, the model of the database can be evaluated to determine if the table to which the constraint is to be added is represented in the model and, if not, an error can be generated. Similarly, the model can be evaluated to determine if all tables or columns referenced by a constraint are present in the model and, if not, an error can be generated. Additionally, referential integrity, uniqueness, nullity may checked for columns referenced by key constraints. In some cases, the representation of the constraint may be added from the simulation model, even if an error is logged.

If a change is requested to delete a constraint, the model can be checked to determine if the constraint is represented in the model. If the constraint is not represented in the model, and error can be logged. If the constraint is represented in the model, deletion of the constraint can be checked against other constraints to determine errors. According to one embodiment, for example, a request to remove a primary key constraint or uniqueness constraint on a column that is referenced by a foreign key constraint may result in an error. In some cases, the representation of the constraint may be removed from the simulation model, even if an error is logged.

If a change is requested to add or modify a trigger to a table; view, materialized view, schema, catalog or database, the model of the database can be evaluated to determine if the object to which the trigger is to be added is represented in the model and, if not, an error can be generated. Similarly the model can be evaluated to determine if all tables, views, columns, functions, stored procedures or other database objects referenced by the trigger are present in the model, and if not, an error can be generated. In some cases, the representation of the trigger may be added to the simulation model even if an error is logged. If a change is requested to delete a trigger, the model can be checked to determine if the trigger is represented in the model. If the trigger is not represented in the model, an error can be logged.

If a change is requested to add a type to a schema, catalog or database, the model of the database can be evaluated to determine if the type already exists and if so, an error can be logged. If the type does not already exist, the model can be updated with the new type. According to one embodiment, the model can be evaluated to determine if all types consistently reference other types and other database objects (tables, columns, views) and log errors when inconsistencies (a referenced type, referenced column, referenced table or referenced view does not exist) are found in the model.

If a change is requested to modify a type in a schema, catalog or database, the model of the database can be evaluated to determine if the type already exists and if it does not yet exist, an error can be logged. If the type does exist, the model can be updated with the new model of the type. According to one embodiment, the model can be evaluated to determine if all types in the model consistently reference other types and other database objects (tables, columns, views) and log errors when inconsistencies (a referenced type, referenced column, referenced table or referenced view does not exist) are found in the model.

If a change is requested to remove a type from a schema, catalog or database, the model of the database can be evaluated to determine if the type already exists and if it does not yet exist, an error can be logged. If the type does exist, the model can be updated to remove the type. According to one embodiment, the model can be evaluated to determine if all types in the model consistently reference other types and other database objects (tables, columns, views) and log errors when inconsistencies (a referenced type, referenced column, referenced table or referenced view does not exist) are found in the model.

If a change is requested to add or modify a synonym to a schema, catalog or database, the model of the database can be evaluated to determine if the synonym already exists in the model. The model can be updated to include the new synonym definition, replacing an old synonym of the same name. If a change is requested to remove a synonym, the model of the database can be updated to remove the synonym. According to one embodiment, the model of the database can then be evaluated to determine if any database object references any synonym and generate errors if named objects do not reference either a synonym or another object with the given name. According to one embodiment, the model of the database can be evaluated to determine if any synonyms reference objects in the database that do not exist.

If a change is requested to add a sequence, the model of the database can be evaluated to determine if the sequence already exists in the model, and if it already exists, an error can be logged. If the sequence does not yet exist, the model can be updated to add the sequence.

If a change is requested to modify a sequence, the model of the database can be evaluated to determine if the sequence already exists in the model, and if it does not already exist, an error can be logged. If the sequence does exist, the model can be updated with the new definition of the sequence.

If a change is requested to remove a sequence, the model of the database can be evaluated to determine if the sequence already exists in the model, and if it does not already exist, an error can be logged. If the sequence does exist, the model can be updated representing the removal of the sequence. According to one embodiment, the model can be evaluated to determine if the sequence to be removed is referenced by another database object, such as a trigger, table, check constraint, view, materialized view, function, procedure or package. If objects represented in the model reference the sequence to be removed by the change, an error can be logged.

Requests to modify objects can be evaluated to determine if the particular object is represented in the model. If not, an error can be generated. The request can also be evaluated to determine if the modification violates a constraint or rule and, if so, an error can be generated. In some cases, the model may be updated to reflect the modification, even if an error is logged.

Additionally, for each request, the user requesting a change can be evaluated against permissions and the table, column, constraint and other parameters evaluated against rules to determine if the change is permissible. The rules can reflect rules applied by the underlying database and user defined rules.

Figure 10:
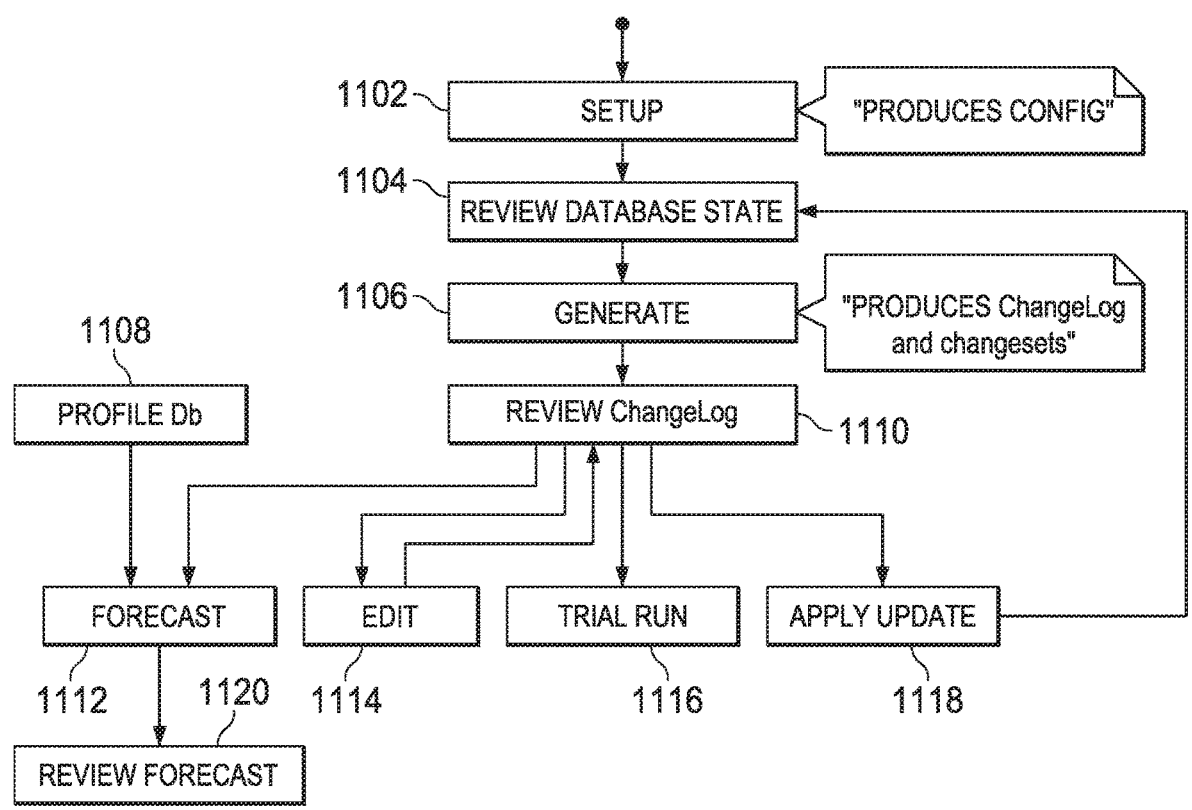
FIG. 10 is a diagrammatic representation of one embodiment of a workflow for forecasting the results of changes.

FIG. 10 is a diagrammatic representation of one embodiment of a workflow for a database change management system to produce a forecast. Information for a project can be provided, such as databases of interest, a project name, connection settings, and configuration information (step 1102). This may involve prompting the user to create a project and setting up connection information for connecting to databases.

Once the connection information for connecting to the database(s) is provided, the database change management system can connect to databases and review the state of database schemas (step 1104) and generate a change log (step 1106). If a database has only been just created, the database will be mostly empty. The database change management system can retrieve profile information from the database (step 1108).

A user can review the change log (step 1110) or other data representing the database schema and enter proposed changes (step 1114). According to one embodiment, for example, the author can author changes in the change log and changesets.

The change log and the profile are used to produce a forecast (step 1112) forecasting the effects of those changes. The user may review the forecast (step 1120) and edit the change log accordingly (step 1114). The user may simulate the changes again (step 1116) and/or apply the changes in the change log to the database schema (step 1118). The report and SQL run log can be preserved on disk or elsewhere from this operation for later inspection.

This process can be repeated over the duration of a project. According to one embodiment, users may email, copy and print reports from forecasts, simulations and applications of change logs while collaborating with their colleagues. Users can also attach these reports to entries in change tracking systems.

A database change management system can provide access to application functionality, including authoring changes by manipulating the change log and authoring changes using an interactive change wizard. According to one embodiment, a GUI module can call services of a software framework (e.g., framework 102) to accomplish tasks based on user interactions with the GUI. According to one embodiment, the GUI may be based on Eclipse RCP and Eclipse Modeling Framework, a Web/HTML/Javascript framework or other framework.

Figure 11:
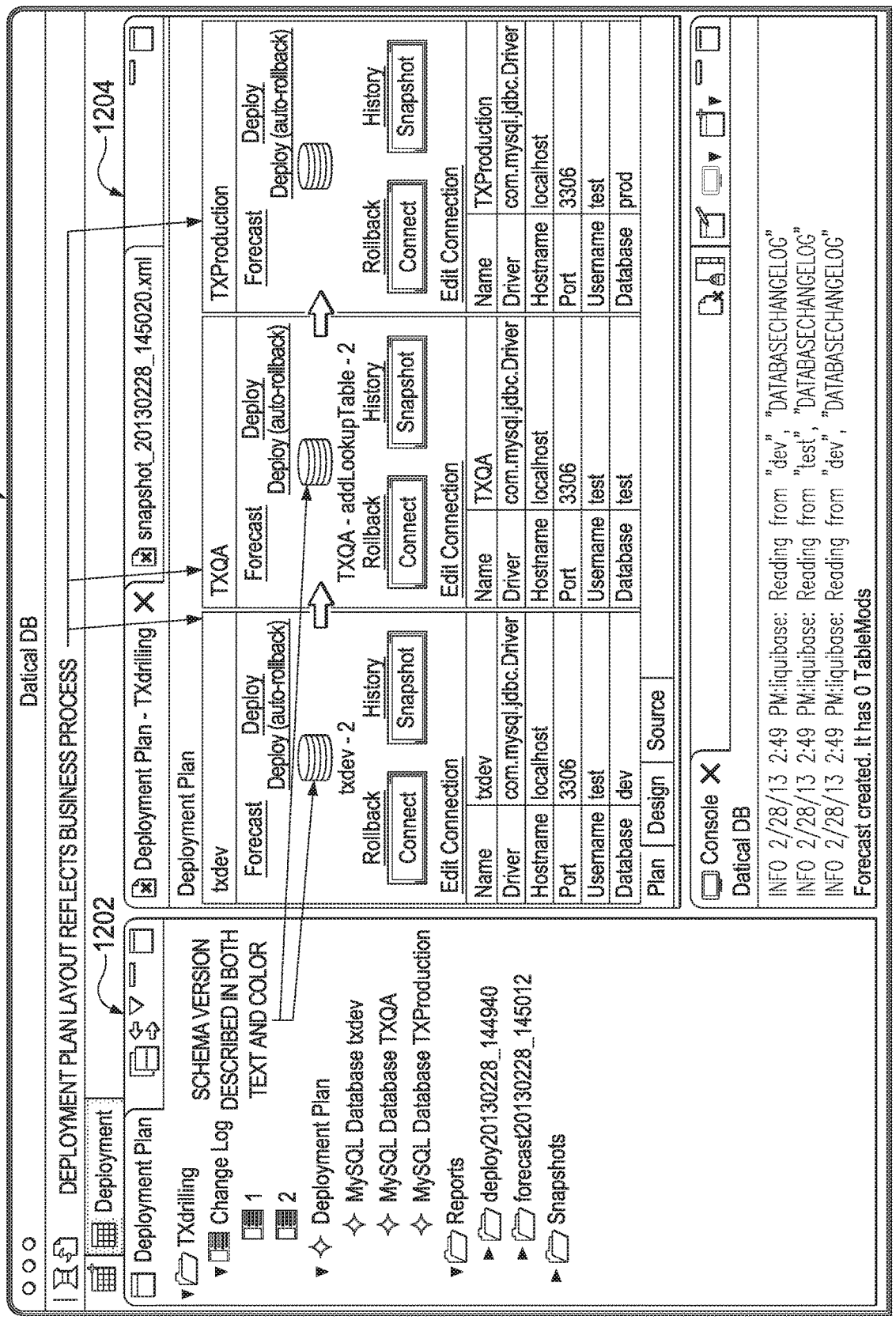
FIG. 11 is a diagram illustrating a graphical user interface according to embodiments.

FIG. 11 is an example of a screen shot of a GUI 1200. In GUI 1200, a deployment plan is illustrated for deploying changes from a development database to a QA database to a production database. In general, a deployment plan represents the general flow of schema changes in an organization. A deployment plan, according to one embodiment, contains one or more (usually several) database definitions (DbDef's) to connect and inspect databases; one or more steps describing the flow of changes from one database to another).

In the example illustrated, at 1202, the GUI displays a folder TXDrilling and a menu structure including associated change logs, deployment plans for associated databases, reports, and snapshots, and may additionally show other components. The GUI may be interactive to allow a user of the GUI to switch between views, reveal more information about displayed components and the like.

In general, the GUI may display various pieces of information including, but not limited to, a project model, a change log, a deployment plan and/or other components. As shown at 1204, the GUI 1200 may display individual databases txdev, TXQA, and TXProduction. Controls may allow for implementing a forecast, deploy, snapshot, etc. In addition, in some embodiments, the schema version is also identified.

In some embodiments, the GUI may support a change authoring wizard to guide a user through authoring a new change. The change authoring wizard may present the user with tables, columns and other schema objects that are appropriate based on a simulated schema model resulting from applying the previous changes. This model is built by the simulation service based on the changesets available in the project.

FIG. 12A-FIG. 12D show screenshots of one embodiment of a change authoring wizard.

According to one embodiment, the options presented in any step may be based on the user's permissions.

Figure 12A:
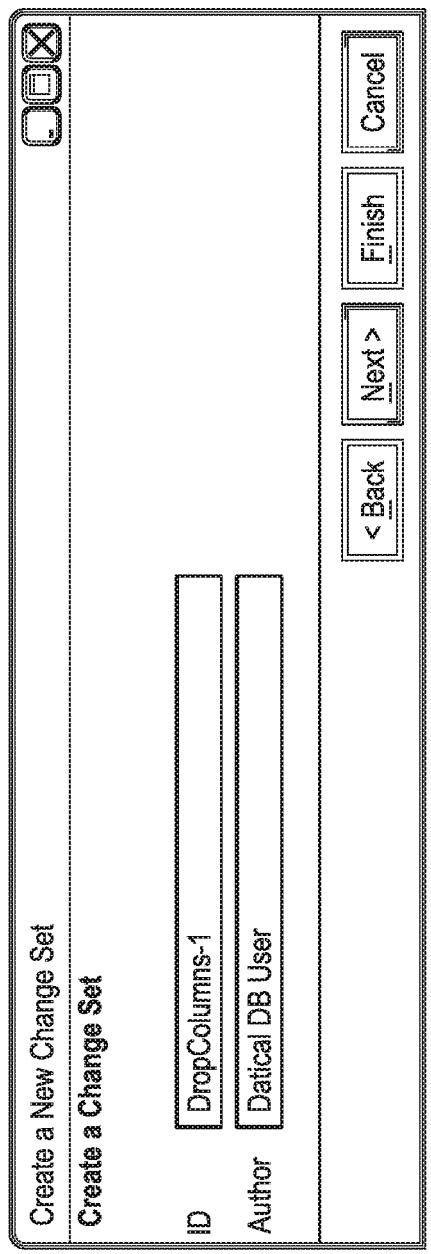
FIGS. 12A, 12B, 12C and FIG. 12D depict graphical user interface wizard screens according to an embodiment.
Figure 12B:
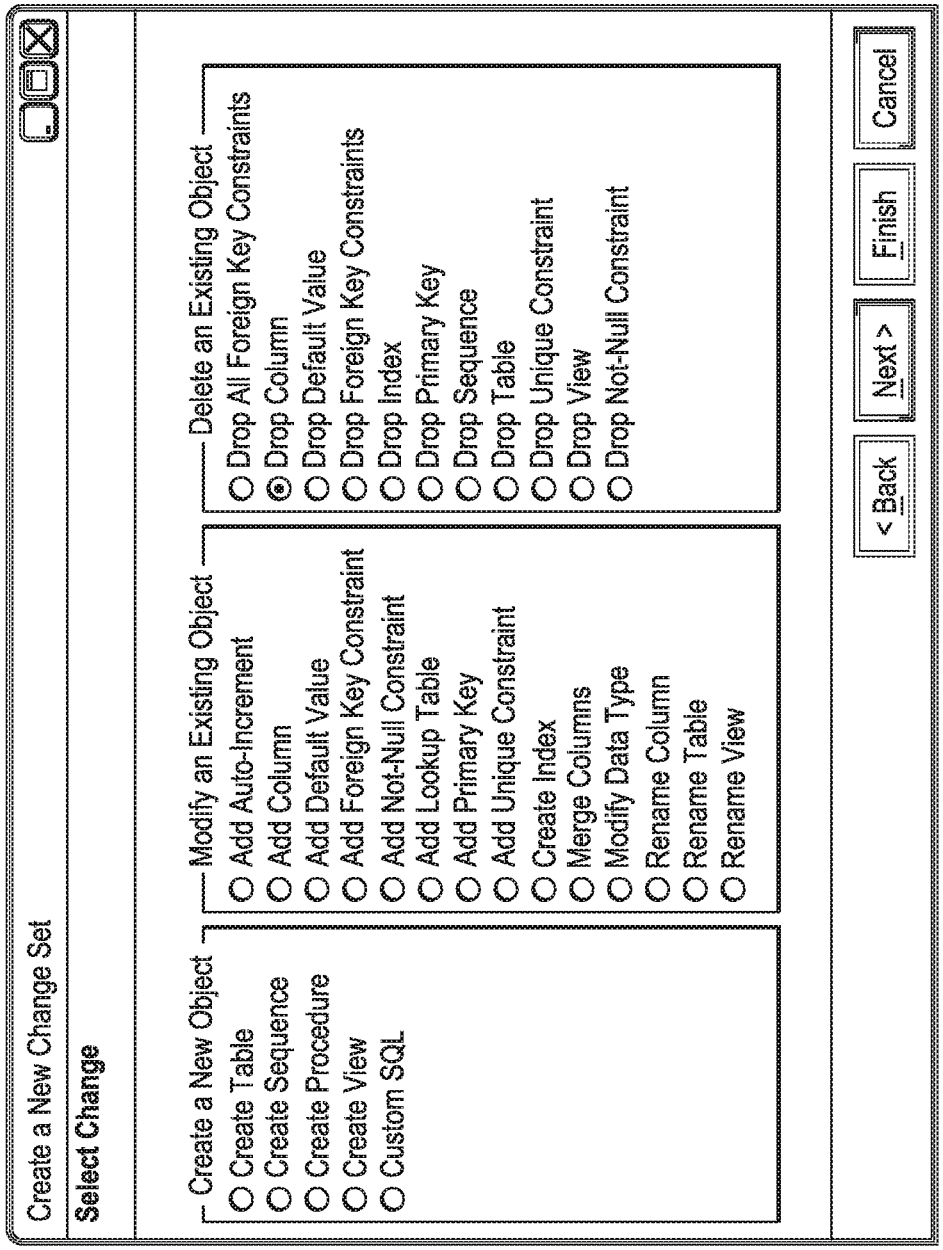
Figure 12C:
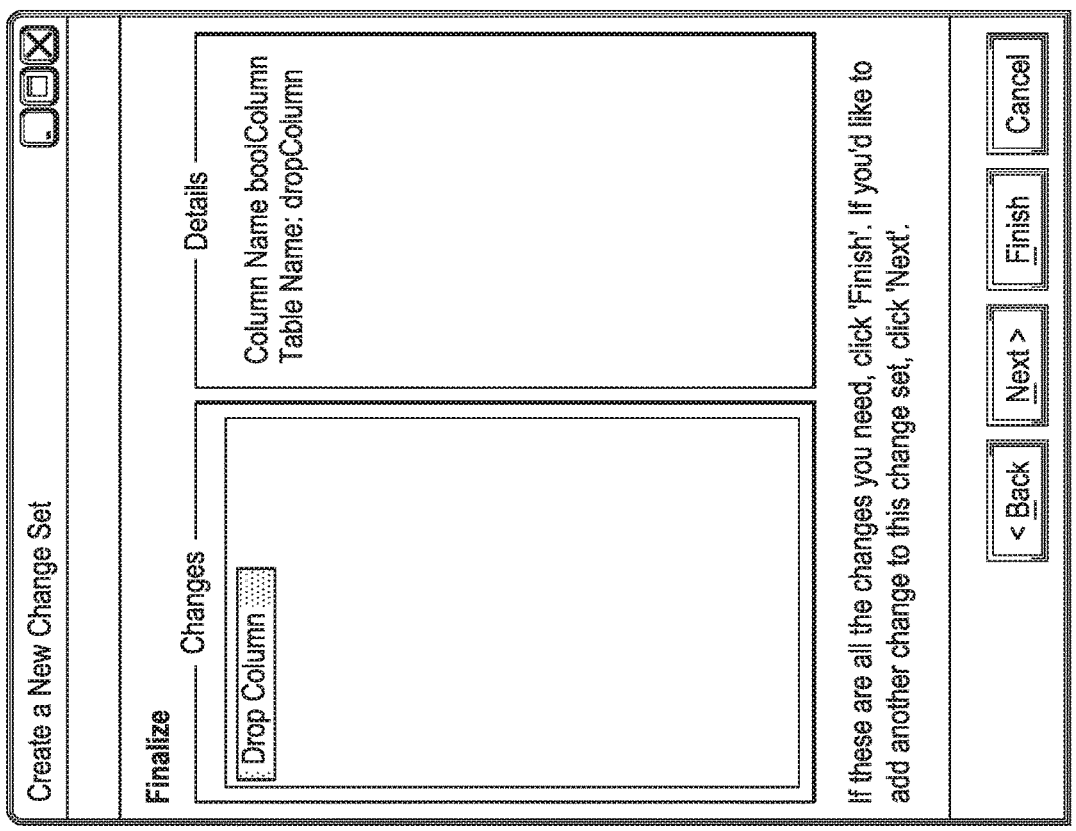
Figure 12D:
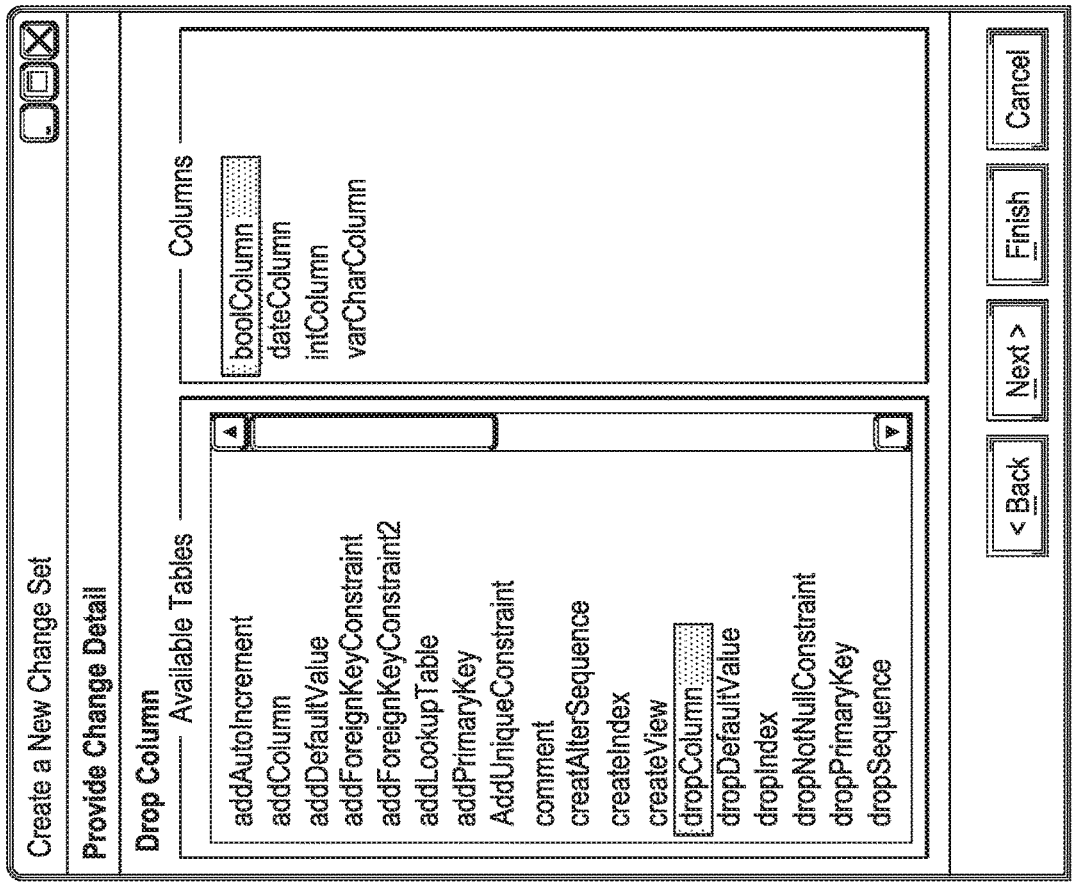

As shown in FIG. 12A, the user may specify a changeID and an author name. In some embodiments, each change can be uniquely identified by the change log file, a changeID and the author's name. As shown in FIG. 12B, the user may select which change type to create. In the embodiment illustrated, these can include new object creation, existing object modification, or existing object deletion. As shown in FIG. 12C, the GUI can present the names of schema objects (table names, column names, stored procedure names, etc.) based on the results of simulation of all of the previous changes as well as other changesets and snapshots available in the project. The user can choose which objects the change will act upon. As shown in FIG. 12D, the GUI presents a summary of the new change to the user for approval.

Figure 13:
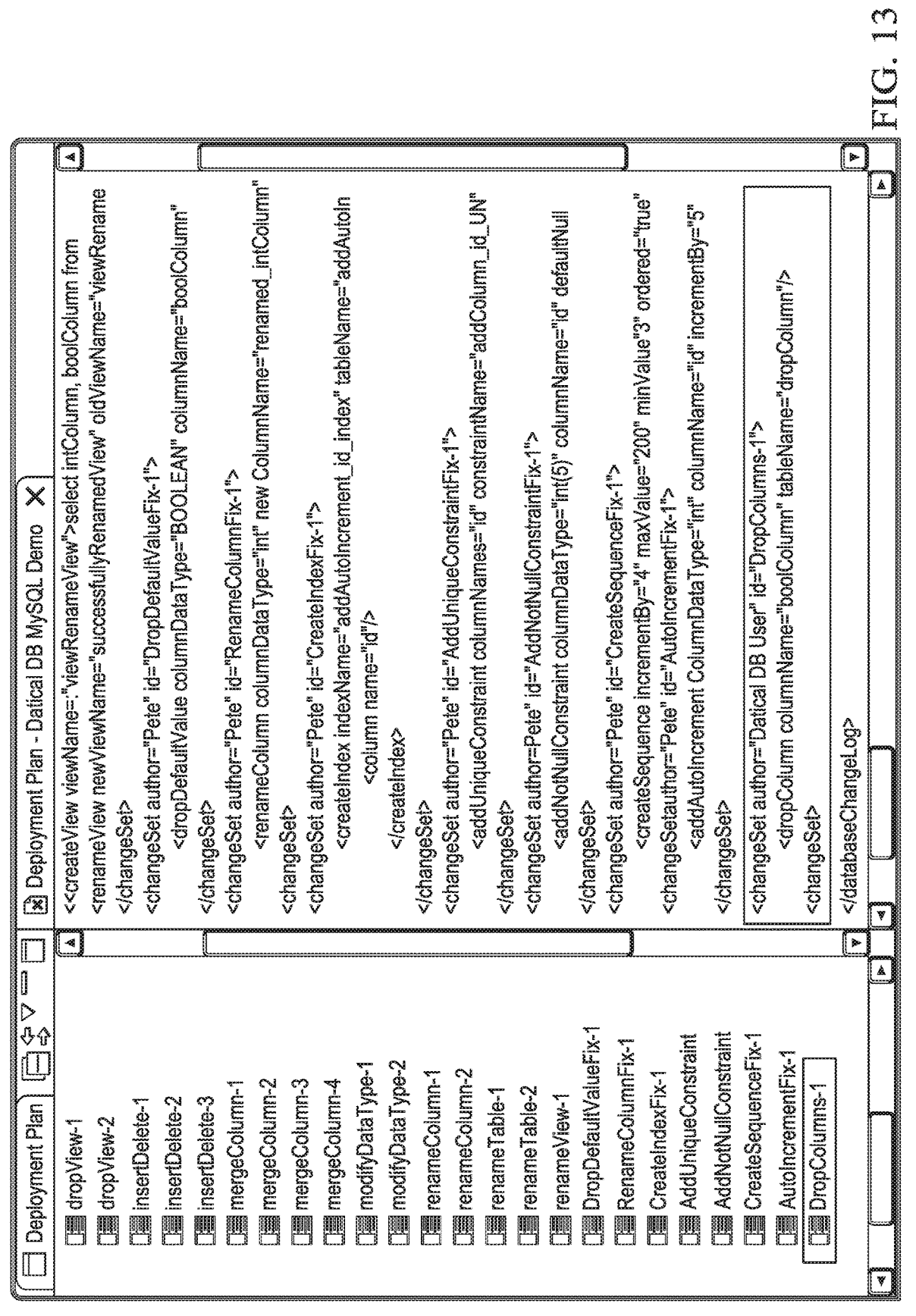

FIG. 13 depicts an interface providing the new change in a change log with the change from FIGS. 12A-12C highlighted. If the user cancels a change, the system can revise the change log, close the wizard and display a view previous to the wizard.

In addition to implementing deployment plans provision can be made for displaying deployments that involve a large number of databases. Such displays may be based, for example, on snapshots or profiles obtained using the snapshot and profile service respectively. Alternatively, such displays may be based on portions of such snapshots or profiles.

For example, shown in FIG. 14A is a tabular view in which properties of deployment steps are shown in rows across columns. In the example illustrated, columns represent database definitions (DbDef), Versions, Servers, and Database identifiers. Databases are grouped according to deployment environment. In the example illustrated, these are Development (Dev), Quality Assurance (QA), and Production environments. In other embodiments, additional or fewer environments may be in use or displayed As illustrated, the deployments are listed alphabetically according to DbDef, although in some embodiments, deployments may be listed alphabetically according to any of the columns or be otherwise listed. In addition, in some embodiments, some deployments may be highlighted as being of note according to predetermined criteria. For example, in the embodiment illustrated, Versions Demo-32 in both Dev and Production are highlighted as being "outliers," i.e., several versions behind others in development or deployment.

Figure 14B:
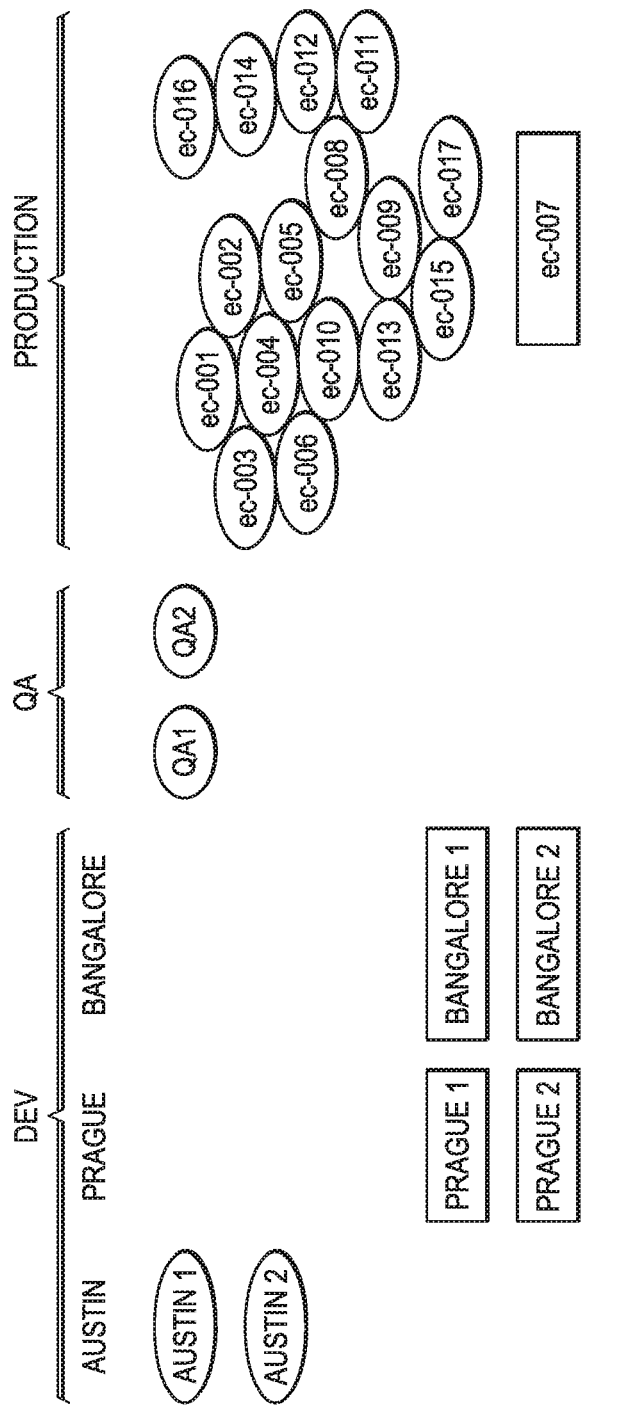

FIG. 14B illustrates an example of a cluster view showing the same databases and deployments as in FIG. 14A. In this case, databases are represented by oval icons and square icons and grouped according to deployment phase. In the example illustrated, the oval icons represent databases that meet particular criteria, while the square icons represent those that do not. For example, as in FIG. 14A, the square icons could represent databases that are versions behind others.

Figure 14C:
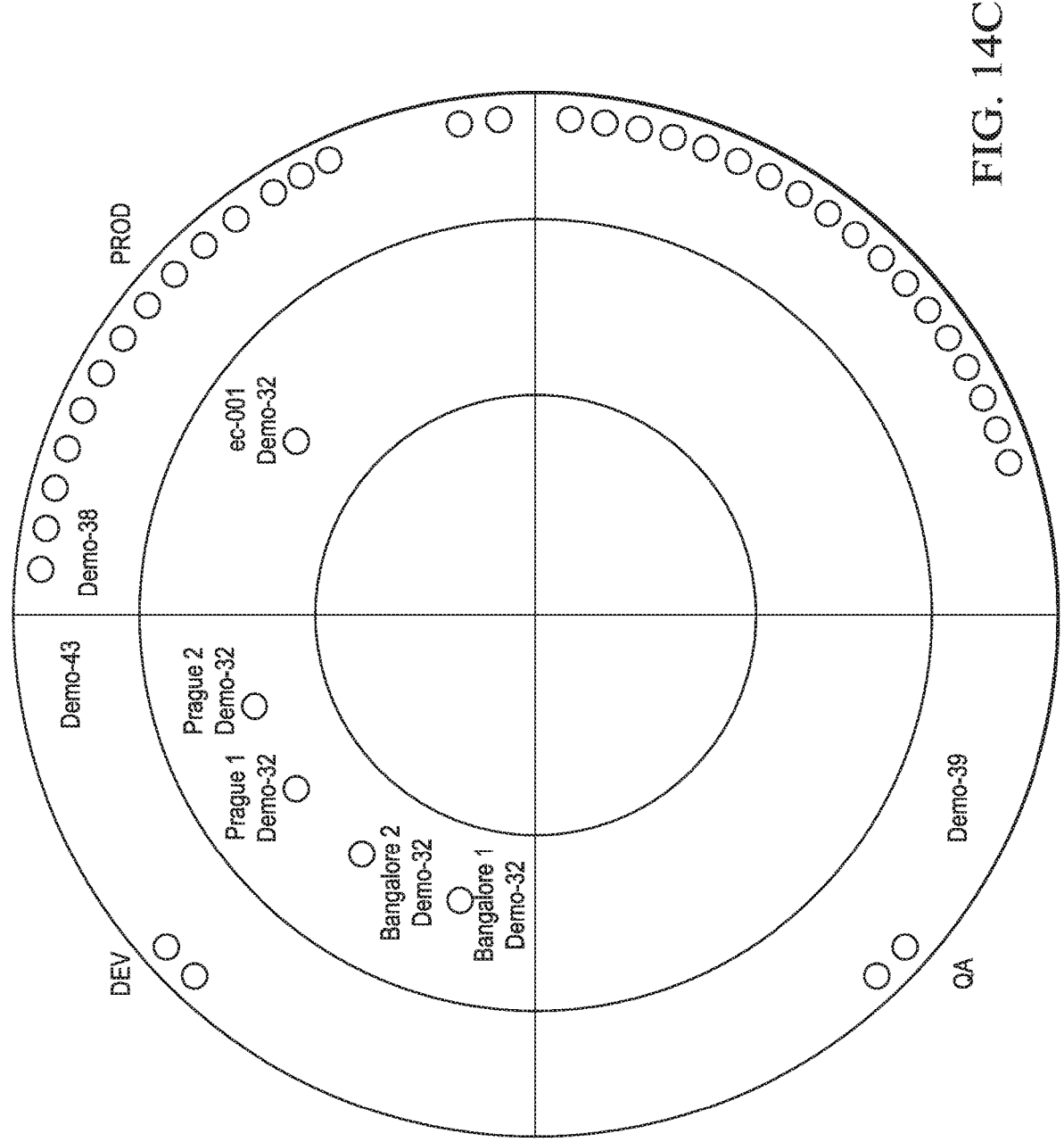

Finally, FIG. 14C illustrates an example radar view 1502 of the same databases and deployments of FIG. 14A and FIG. 14B. The radar view 1502 can be divided into sectors based or depending on the number of development environments. In the example illustrated, the radar view 1502 is divided into four quadrants (QA, Dev, Prod, and unnamed), although there are only three development environments. Thus, depending on the embodiment, the radar view 1502 could be divided into a number of sectors equal to the number of development environments or greater than or less than the number of development environments.

In the radar view 1502, icons representing databases are plotted in sectors and at radii based on state, revision, or step classification. Thus, for example, in the Dev environment sector, two icons corresponding to Dem-43 are provided at the outer edge (farthest from center) to indicate that these are the most advanced versions. Four others, representing the Demo-32 databases, are located closer to the center, indicating they are in a less advanced stage.

In some embodiments, the display of the icons may be scaled consistently across the sectors, although in others, the display of icons is only scaled within each sector. Thus, for example, in the Prod environment sector, the databases at Demo-32 are at the outermost edge of the sector and apparently at the same distance as the Demo-43 databases from the Dev sector. The radar view is particularly well suited to large numbers of databases, complex deployment plans and use in dashboards and augmented reality systems.

Figure 15:
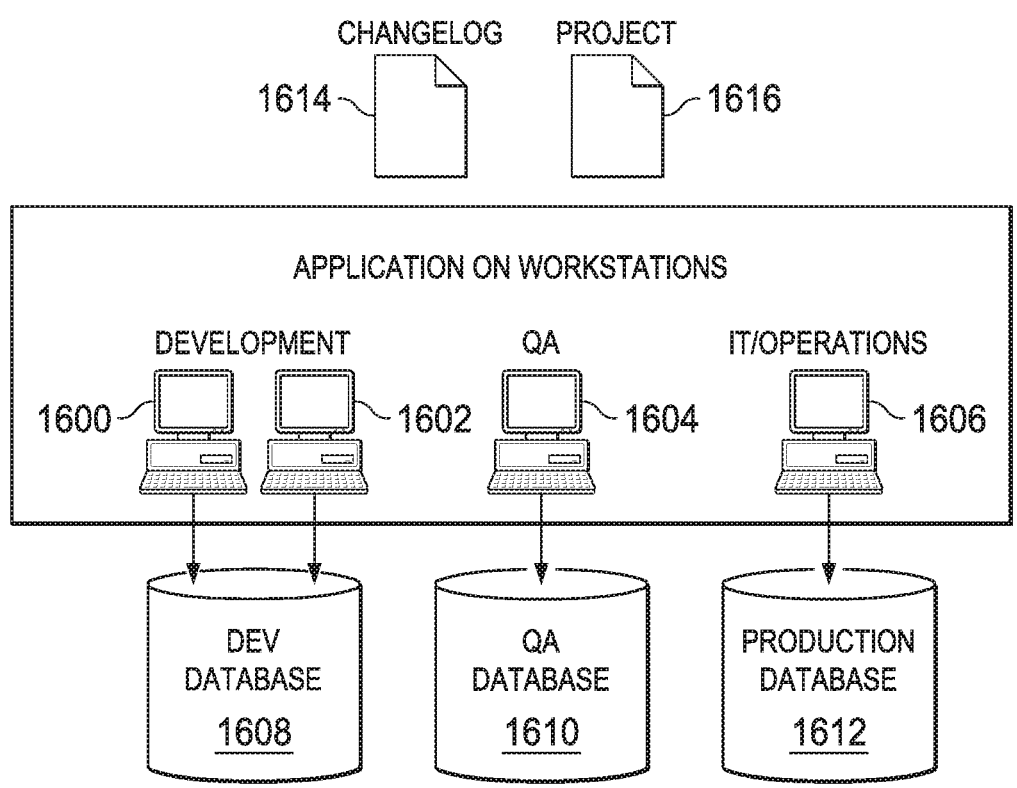
FIG. 15 is a diagrammatic representation of one embodiment of a topology for database change management.

FIG. 15 is a diagrammatic representation of one embodiment of a topology for database change management comprising a set of development computing devices (computing device 1600 and computing device 1602) with access to a development database 1608, a QA stage computing device 1604 with access to a QA database 1610 and a production environment computing device 1606 with access to a production database 1612. Each computing device may comprise one or more processors, memories, interfaces and computer readable media storing computer instructions executable to provide a database change management system including.

According to one embodiment, a database change management application on each computing device reads project files 1616 and change log files 1614 from disk and connects to database servers using JDBC or other connectivity. In other embodiments, change log files 1614 and project files 1616 can be stored on a server that provides, for example, version control.

The computing device on which the application is running can connect to the database server to be changed over a network. Access to database servers can be segregated to specific teams or roles. Thus, for example, authorized users in the development environment can access the development database 1608, authorized users in the QA environment can access QA database 1610 and authorized users for the production environment can access production database 1612.

To provide some additional context, an example of database change management in the context of software development is provided. In this example, a software team can assign a change ticket to a developer. The developer at computing device 1600 checks out the project from version control and determines a change to the database is necessary to carry out the assignment. The developer uses the database change management application to author a change to be applied to databases and to forecast the effect of the change using development database 1608. The developer may repeat change authoring and forecasting until satisfied with the result. The developer can then commit the change log file to version control.

If the developer is not a database specialist, the developer may seek additional review before committing changes. In this circumstance, the developer can attach the forecast report to a trouble ticket and request that a database analyst review it. The database analyst may make a suggestion, and assign the ticket back for improvement, or approve the database change.

The developer or analyst can then assign the ticket to a testing department. A tester checks out the project from version control, reviews forecasts and executes the change on a QA copy of the database 1610. If satisfied, the tester can approve the ticket for deployment to production. A deployment specialist can check out the project from version control, launch the database change management application (e.g., at computing device 1606) and apply the change to one or more production databases 1612. The deployment specialist can attach the logs from the database change management application to the change ticket.

Figure 16:
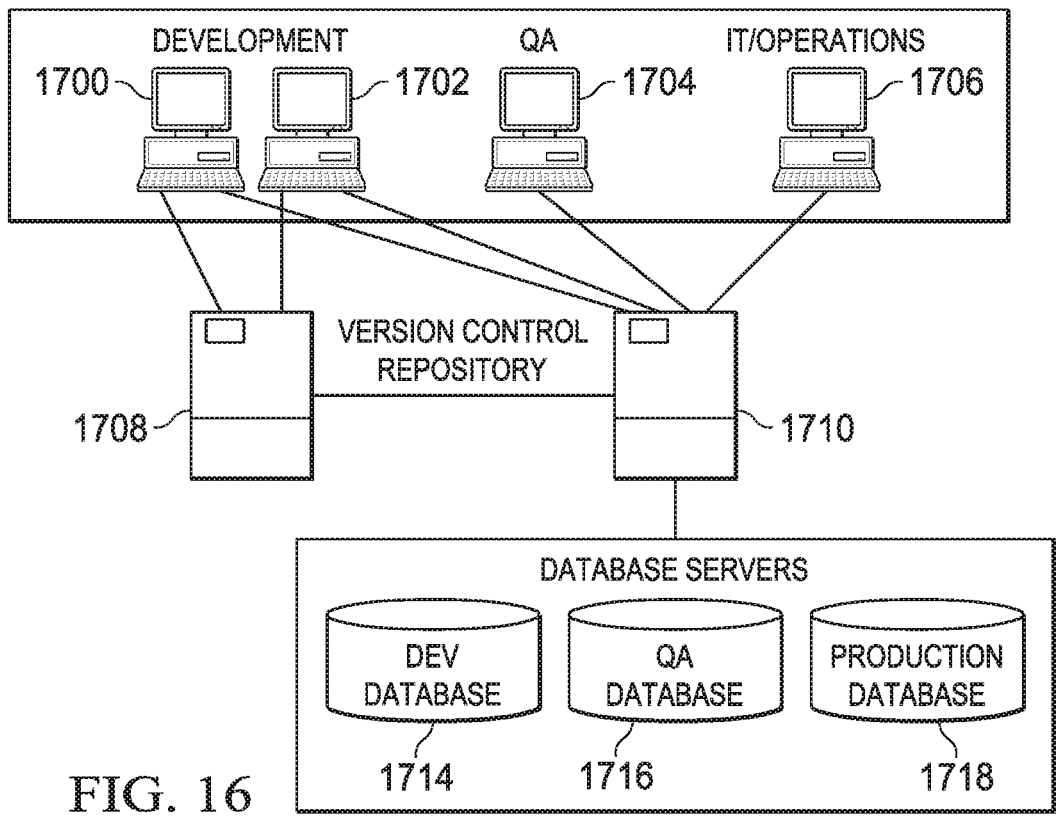
FIG. 16 is a diagrammatic representation of another embodiment of a topology for database change management.

FIG. 16 is a diagrammatic representation of another embodiment of a topology for database change management comprising a set of development computing devices (computing device 1700 and computing device 1702), a QA stage computing device 1704 and a production environment computing device 1706. The computing devices may connect to one or more servers including a version control repository server 1708 and a continuous integration server 1710. Version control server 1708 comprises one or more servers that provide access to a version control repository. Continuous integration server comprises one or more servers that run a continuous integration program, such as the Jenkins continuous integration code (available from www.jenkins-ci.org) or other continuous integration program and a database change management application. While shown separately, a single server can provide version control, continuous integration and database change management.

Continuous integration server 1710 can work in conjunction with version control server 1708 to automatically schedule and execute tasks in response to changes made to files in the version control repository. In this configuration, an application can be used on a client computing device (e.g., computing device 1700, 1702, 1704 or 1706) to make changes and commit them to version control. The continuous integration server code can use a CLI interface or other interface to the database change management application running on the continuous integration server 1710 to affect those changes on one or more database servers to, for example, simulate and deploy changes to development database 1714, QA database 1716 and production database 1718. Users can adjust configuration of the database change management application and the continuous integration server with standard web browsers or through other interfaces.

Providing a similar example to that discussed in conjunction with FIG. 15, a developer at computing device 1700 can check out a project from version control and determine that a change to a database is necessary to carry out an assignment. The developer uses the database change management application to author a change to be applied to databases and to forecast the effect of the change using development database 1714. The developer may repeat change authoring and forecasting until satisfied with the result. The developer can commit the change log file to version control.

Continuous integration server 1710 detects the change in the version control repository and checks out the latest changes. Continuous integration server 1710 runs a forecast (e.g., using a forecast service). Continuous integration server 1710 can alert the software development team if the forecast predicts a failure or can apply the changes to QA database 1716 and test the project software against the changed database 1716. After testing is complete, continuous integration server 1710 can migrate the changes to production database 1718.

Figure 17:
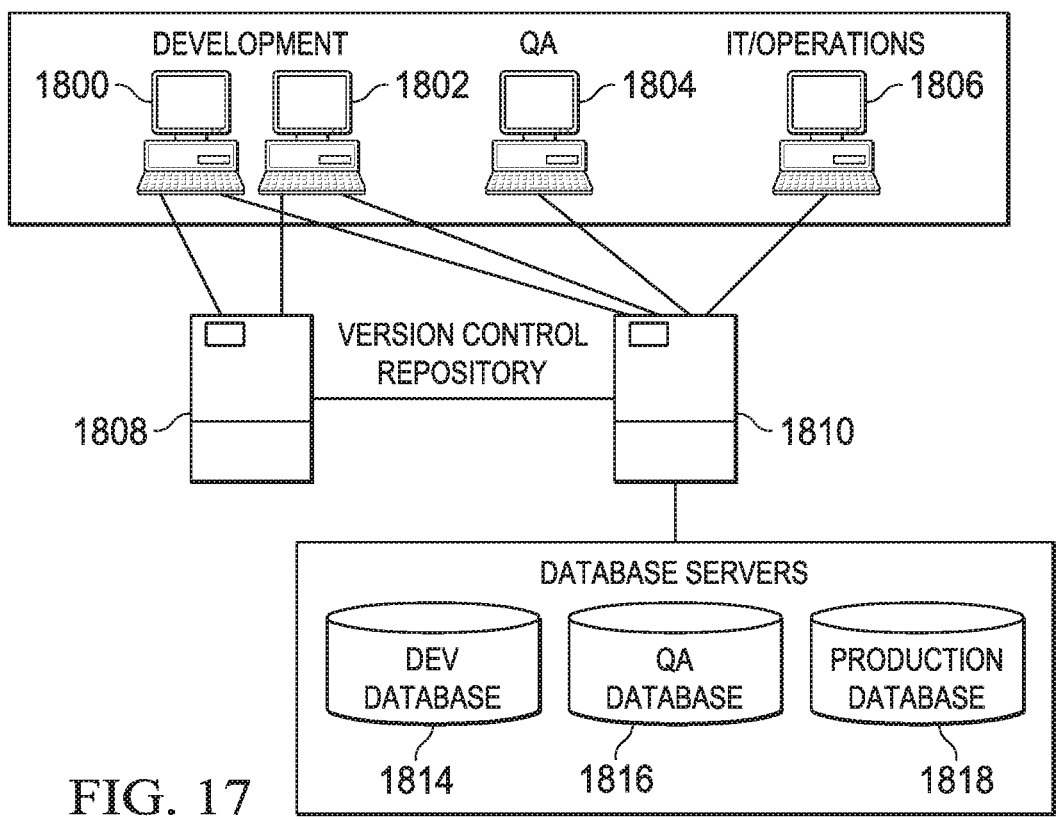
FIG. 17 is a diagrammatic representation of yet another embodiment of a topology for database change management.

FIG. 17 is a diagrammatic representation of another embodiment of a topology for database change management comprising a set of development computing devices (computing device 1800 and computing device 1802), a QA stage computing device 1804 and a production environment computing device 1806. The computing devices may connect to one or more servers including a database change management web application server 1810 or a version control server 1808. Version control server 1808 comprises one or more servers that provide access to a version control repository. Database change management web application server 1810 comprises one or more servers that run web server code and a database change management application. In some cases, the web server code may be run on separate web servers and the database change management web application on application servers. While shown separately, a single server can provide version control, web server functionality and the database change management web application.

Users can access the database change management functionality without running the application directly on their computing device. The user can employ a standard web browser on a computing device to connect to the database change management web application server 1810. Database change management web application server 1810 can communicate with version control server 1808 to store change logs, project files and other information. Database change management web application server 1810 connects to the database servers to inspect the databases, simulate changes and deploy changes to development database 1814, QA database 1816 and production database 1818. In other embodiments, a continuous integration server may also be provided that detects changes in the version control repository made by database change management web application server 1810 and processes the changes in a similar manner as discussed above.

While embodiments described herein have been discussed primarily in terms of database change management, embodiments may also be applied to management of other managed systems including physical networking equipment (e.g., routers, switches, load balancers, firewalls, etc.), software defined networks, servers and server stacks (e.g., web server, application server, email, DNS, etc.), mainframes, mobile devices (e.g., phones, tablets, watches, or other mobile device), home automation equipment (e.g., IP cameras, thermostats, light switches, lights, alarms, window coverings (internal & external)) and other systems from which configuration can be collected can be managed. Changes to various configuration data can be simulated using a model representing configuration objects that can be added, deleted or modified and the results forecast. Examples of configuration data include, but are not limited to, application settings network information, security information, module and add-on configurations, hostnames, database connections, user accounts, IP addresses and other configuration information.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented by execution of suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented using control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement through execution of software programming or code steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code executed by a processor, by using application specific integrated circuits, programmable logic devices, field programmable gate arrays, optical, chemical, biological, quantum or nanoengineered systems, components and mechanisms. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A computer program product comprising a non-transitory, computer-readable medium storing computer-executable instructions, the computer-executable instructions comprising instructions for:

opening a connection from a first computing device to a database maintained by a database server;

querying the database for a current state of a database schema;

collecting a snapshot of the database schema for the database, the snapshot comprising a first set of changes representing the current state of the database;

collecting database profile information comprising row counts of tables;

receiving a set of proposed changes to the database schema;

building an in-memory model of the database schema according to the first set of changes, the in-memory model of the database schema comprising a set of model objects modelling tables, columns, primary key constraints, foreign key constraints, and data constraints on the columns of the database, the set of model objects related according to the database schema of the database, the in-memory model of the database schema incorporating at least a portion of the database profile information, wherein building the in-memory model comprises loading an initial model in memory and applying the first set of changes starting with the initial model and wherein the in-memory model comprises:

table objects representing tables of the database;

column objects representing columns of the database, each column object related in the in-memory model to a corresponding table object according to the database schema;

primary key constraint objects representing primary key constraints, each primary key constraint object related in the in-memory model to a column object representing a column of the database to which a corresponding primary key constraint applies;

foreign key constraint objects representing foreign key constraints, each foreign key constraint object related in the in-memory model to a column object representing a column of the database to which a corresponding foreign key constraint applies;

data constraint objects representing data constraints, each data constraint object related in the in the in-memory model to a column object representing a column to which a corresponding data constraint applies;

accessing the in-memory model of the database schema;

accessing a set of rules comprising rules modelling rules applied by the database and additional user defined rules;

simulating an application the set of proposed changes to the database, the simulating comprising:

selecting a change from the set of proposed changes as a selected change;

mapping the selected change to a command on the in-memory model to update the in-memory model according to the selected change;

determining if the command violates the set of rules;

based on a determination that the command violates the set of rules, logging an error in association with the selected change and a state of the in-memory model;

determining if a result of simulating the application of the set of proposed changes includes at least one error indicative of failure:

if the result of simulating the application of the set of proposed changes includes at least one error indicative of failure, generating a report indicative of a prediction of a failure, the report including a context of the at least one error indicative of failure; and if the result of simulating the application of the set of proposed changes does not include at least one error indicative of failure, deploying the set of proposed changes to the database based on a determination that the application of the set of proposed changes would be successful.

2. The computer program product of claim 1, wherein the computer-executable instructions comprise instructions for repeating the selecting, mapping and determining if the command violates the set of rules for each change in the set of proposed changes.

3. The computer program product of claim 1, wherein the snapshot of the database schema comprises a change log.

4. The computer program product of claim 3, wherein the computer-executable instructions comprise instructions adding the set of proposed changes to the change log.

5. The computer program product of claim 1, wherein determining if the command violates the set of rules comprises determining if the command is to modify the in-memory model in violation of a set of constraints modeled in the in-memory model of the database schema.

6. The computer program product of claim 1, wherein deploying the set of proposed changes to the database further comprises sending SQL commands from the first computing device to the database server to update the database schema according to the set of proposed changes.

7. The computer program product of claim 1, wherein the computer-executable instructions comprise instructions for providing a graphical user interface to view multiple databases in a radar view, wherein the multiple databases are plotted in sectors and at radii based on a state classification, revision classification, or step classification.

8. The computer program product of claim 1, the first computing device comprises a web application server.

9. The computer program product of claim 1, wherein the database profile information comprises a permissions model, wherein determining if the command violates the set of rules comprises determining if an author of the selected change is permitted to make the selected change based on the permissions model and wherein determining if the command violates the set of rules comprises determining if the author of the selected change is not permitted to make the selected change.

10. The computer program product of claim 1, wherein building the in-memory model further comprises:
iterating through the first set of changes in sequence;
for each change in the first set of changes to add a table, creating a new table object in the in-memory model;
for each change in the first set of changes to add a column, creating a corresponding column object in the in-memory model, the corresponding column object related in the in-memory model to a table object representing a database table containing the column;
for each change in the first set of changes to add a primary key constraint, creating a corresponding primary key constraint object in the in-memory model;
for each change in the first set of changes to add a foreign key constraint, creating a corresponding foreign key constraint object in the in-memory model; and
for each change in the first set of changes to add a data constraint, creating a corresponding data constraint object in the in-memory model.

11. The computer program product of claim 1, wherein determining if the command violates the set of rules comprises determining if the command is to modify or remove an object from the in-memory model that does not exist in the in-memory model.

12. The computer program product of claim 1, wherein determining if the command violates the set of rules comprises determining if the command is to add a new object to an object that does not exist in the in-memory model.

13. The computer program product of claim 1, wherein determining if the command violates the set of rules comprises determining if all objects referenced by a new object are represented in the in-memory model.

14. The computer program product of claim 1, wherein determining if the command violates the set of rules comprises determining if the command is to add an object that already exists to the in-memory model.

\* \* \* \* \*